(12) United States Patent
Straser et al.

(10) Patent No.: US 6,292,108 B1
(45) Date of Patent: Sep. 18, 2001

(54) MODULAR, WIRELESS DAMAGE MONITORING SYSTEM FOR STRUCTURES

(75) Inventors: Erik G. Straser, Redwood City; Anne S. Kiremidjian, Los Altos Hills; Teresa H. Meng, Portola Valley, all of CA (US)

(73) Assignee: The Board of Trustees of the Leland Standford Junior University, Stanford, CA (US)

( * ) Notice: Subject to any disclaimer, the term of this patent is extended or adjusted under 35 U.S.C. 154(b) by 0 days.

(21) Appl. No.: 09/148,245

(22) Filed: Sep. 4, 1998

Related U.S. Application Data

(60) Provisional application No. 60/057,901, filed on Sep. 4, 1997.

(51) Int. Cl.⁷ .................................................... G08B 1/08
(52) U.S. Cl. ........................ 340/870.11; 340/870.21; 340/870.06; 340/539; 340/870.16; 73/649
(58) Field of Search .................... 340/870.01, 870.21, 340/870.06, 429, 683, 690, 689, 601, 539, 870.11, 870.16; 73/649, 786, 769

(56) References Cited

U.S. PATENT DOCUMENTS

| | | | |
|---|---|---|---|
| 4,480,480 | * 11/1984 | Scott | 73/769 |
| 5,046,290 | * 9/1991 | Ishit | 52/1 |
| 5,421,204 | * 6/1995 | Svaty | 73/786 |
| 5,507,188 | * 4/1996 | Swaty | 73/756 |
| 5,726,637 | * 3/1998 | Miyahara et al. | 340/690 |
| 5,871,451 | * 2/1999 | Unger | 600/509 |
| 5,892,758 | * 4/1999 | Argyroudis | 370/335 |
| 5,948,984 | * 9/1999 | Hedberg | 73/588 |
| 5,960,807 | * 10/1999 | Reyman | 137/1 |
| 6,012,337 | * 1/2000 | Hodge | 73/803 |
| 6,028,247 | * 1/2001 | Agre | 340/539 |
| 6,049,273 | * 4/2000 | Hess | 340/539 |
| 6,122,271 | * 9/2000 | McDonald et al. | 370/345 |
| 6,138,516 | * 10/2000 | Tillman | 73/649 |
| 6,181,841 | * 1/2001 | Hodge | 385/12 |

* cited by examiner

Primary Examiner—Michael Horabik
Assistant Examiner—Albert K. Wong
(74) Attorney, Agent, or Firm—Lumen Intellectual Property Services, Inc.

(57) ABSTRACT

A structural monitoring system comprises a plurality of modular, battery powered data acquisition devices which transmit structural information to a central data collection and analysis device over a wireless data link. The data acquisition devices each comprise mechanical vibration sensors, data acquisition circuitry, a digital wireless transmitter, and a battery for providing electrical power to the device. The central data collection device comprises a digital wireless receiver that receives data sent from the data acquisition devices, and a microprocessor for processing the data. A more powerful computer may be interfaced with the central device to provide more sophisticated analysis after a natural hazard or other extreme event. A methodology for operating the monitoring system is also disclosed.

10 Claims, 15 Drawing Sheets

Proxim Packet Exchange Protocol (PPX-1)

| SoH Start of Header | LenH High Byte of Length | LenL Low Byte of Length | Header Chk = NOT (Lenh) + NOT (Lenh) | Modem Command Protocol | ChecksumH High Byte of Checksum | ChecksumL Low Byte of Checksum |
|---|---|---|---|---|---|---|
| 1 | 1 | 1 | 1 | 1 to 570 | 1 | 1 |

Fig. 7

MCP Transmit Data Packet Syntax

| PPX-1 Header Check | "T" | Sequence Number | LenH | LenL | DestAddH |
|---|---|---|---|---|---|
| Bytes: 1 | 1 | 1 | 1 | 1 | |

| DestAdd3 | DestAdd2 | DestAddL | System Protocol | PPX-1 ChecksumH |
|---|---|---|---|---|
| 1 | 1 | 1 | 12 to 562 | |

Fig. 8

System Protocol

| Sequence Number | Packet Type | Unused | Unused | |
|---|---|---|---|---|

| OffsetH | Offset3 | Offset2 | OffsetL | |
|---|---|---|---|---|

| LengthH | Length3 | Length2 | LengthL | Data or Samples |
|---|---|---|---|---|

Fig. 9

All Other Floors

1st Floor

Extreme Event Monitoring Procedure

MODULAR, WIRELESS DAMAGE MONITORING SYSTEM FOR STRUCTURES

This application claims priority from U.S. Provisional Patent Application No. 60/057,901 filed Sep. 4, 1997 which is incorporated herein by reference.

This invention was supported by Grant No. CMS-9526102 awarded by the National Science Foundation. The U.S. Government has certain rights in the invention.

BACKGROUND

Recent earthquakes have caused extensive damage to large metropolitan areas. In 1989, the Loma Prieta earthquake caused selective damage to critical arteries in the transportation systems in the San Francisco Bay Area and underscored the need for rapid screening of structures and lifelines. The Northridge earthquake in 1995 caused significant problems with welded connections in steel frame buildings. The underlying damage was not manifested due to the architectural coverings of these buildings. Therefore, this potentially life-threatening damage went undetected for months exposing thousands to unnecessary risk. The Kobe earthquake in Japan in 1996 brought extensive damage to transportation and other lifelines throughout the area. In addition, there was a lack of action in the first 24 hours after the event.

Clearly, extreme events, i.e. natural disasters such as earthquakes, hurricanes, tornados and floods, can have serious negative impact on society by causing human suffering and economic losses. In addition, danger is also posed by long-term deterioration of large civil structures, especially on exposed skeletal structures such as bridges. A number of collapses and failures have occurred over the last few decades pointing to the need for the remote detection and diagnosis of bride structures.

With the significant negative impact that extreme events and long term deterioration can have on the built environment, monitoring of civil structures holds promise as a way to provide critical information for near real-time condition assessment. This information can be used in the prudent allocation of emergency response resources after earthquakes and for identification of incipient damage in structures experiencing longp-term deterioration. There is an economic and societal need to improve the response and condition assessment capabilities immediately following earthquakes and to extend the useful life of current infrastructure.

The vast majority of known work on monitoring civil structures has focused on developing algorithms to advance the detection and diagnosis of damage to structures. Little work has been done, however, to advance the hardware platform used to gather the data used by these algorithms. Many of the existing monitoring algorithms and strategies assume a sophisticated hardware infrastructure that has large up-front cost, low cost to benefit ratio, costly system installation, and expensive life-cycle operation and maintenance.

In particular, the current state-of-the-art hardware systems for monitoring structures use cables to transmit sensor signal data to a central unit. Monitoring civil structures, however, involves many long lengths of cable to cover the large spatial distances. In addition to being expensive to install, these cables can fail due to exposure to the environment or potential damage during extreme events. Long cables also result in sensor signal degradation. Current monitoring systems are not capable of providing rapid condition screening of structures exposed to extreme events in near real time, i.e., in tens of minutes. Known analysis procedures for long-term monitoring are limited to two classes, either modal or physical engineering parameter based, such as strain or corrosion sensing. Monitoring strategies in the past have focused largely on one class or the other. Both have shown promise in laboratory experiments but fall short when applied to generic real world civil structures.

The most common monitoring system is the heating, ventilation, and air conditioning system (HVAC) found in some homes and most commercial buildings. This monitoring system acquires data from its sensors, thermostats, and then adjusts the temperature of the forced air in the room through a simple threshold analysis technique. Other examples include home and office security systems. These monitoring systems acquire data from the passive infrared devices in rooms and contact surfaces near doors and windows to determine if a person has entered the area or is attempting to enter the area. In each case, the core characteristics are the ability to sense an external physical quantity, temperature, humidity, heat, or contact, and to perform useful actions or make useful analysis for presentation to the user. In the case of monitoring civil structures, however, the degree of sophistication in the instrumentation and the computational and data processing needs are far greater due to the increased number of instruments and the algorithms used.

Today's monitoring systems for civil structures are extensions of the laboratory based instrumentation systems. As shown in FIG. 1, they are characterized as having centralized data acquisition device 10 connected to various sensors 12 through cables 14. The cables are usually shielded coaxial cable. The most commonly used sensor for monitoring vibrations in civil structures is the accelerometer. The accelerometer is a transducer that converts the local acceleration field into an electrical signal proportional to the input acceleration. Common sensor designs are based on the use of piezo-electric, piezo-resistive, force-balance, and capacitive principles. These accelerometers output an analog signal that needs to be sampled and digitized for use in modern data processing systems. The conduit between the sensor and the data acquisition is usually, in the case of civil structures, a long shielded cable. The length of this cable can range from 10 to 1000 feet in practice. For a large number of sensor locations, the cabling requirements scale quite poorly. With all of the analog signals available at the centralized data acquisition system, an analog to digital converter is used to discretize the analog waveforms. The discretized data is then processed and archived for later analysis.

For systems with greater than 16 channels, it is common to have a data acquisition mainframe that accepts several cards or modules for acquiring groups of 8 or 16 channels at once. The mainframe will hold several of these cards giving the entire system a channel count near 64 channels. The cost of the mainframe and the incremental cost of each additional card or module represent step increases in cost and capacity limits for the monitoring system. For example, a mainframe with four 8-channel data acquisition modules can acquire 32 channels of data simultaneously. The need to add one more channel requires the purchase of an additional 8-channel module, representing approximately a 20% increase in cost.

Due to the wide application of these instrumentation systems, they are designed with maximum data sampling rates in the ten's of kHz. These rates are appropriate for applications in automotive and aerospace industries, but well above the need of monitoring civil structures for global vibrational quantities. With sampling rates in the ten's of kHz and significant channel counts a high bandwidth bus is necessary between the data acquisition mainframe and the data storage devices. Traditionally, this has also required the use of a Unix based workstation for data transmission and analysis. These instrumentation schemes are appropriate for controlled and fixed laboratory settings. Operating these systems in the field creates obstacles and problems for which the instrumentation was not originally designed.

The wealth of sophisticated hardware in these systems places great requirements on the data acquisition software. Fortunately, instrumentation vendors such as Hewlett Packard provide their own data acquisition and storage software. This software runs from the Unix workstation and configures the data acquisition mainframe and coordinates the transfer and storage of the acquired data. This completes the instrumentation component of a monitoring system.

With the data archived in the storage devices of the Unix workstation, a number of analysis procedures can be done to process the data and extract meaningful results. For the periodic monitoring of civil structures, it is typical to perform a modal analysis of the recorded acceleration time histories. There are a number of commercial software packages available for modal analysis, each with their own merits. In many cases, the modal analysis is just the first step in the data analysis.

With modal analysis the resulting information are the modal frequencies, mode shapes, and modal damping. This information can be used as input to a variety of engineering analysis procedures from finite element models (FEM) to fatigue mechanisms to constitutive models. In addition, current modal information can be combined with previous information in a Bayesian framework to make better estimates of probable damage locations and severity. In general, the use of these analysis procedures requires a great amount of familiarity with the specific structure and engineering judgement in the analysis process.

At this stage, the user of the monitoring system has taken raw digitized data and extracted the relevant engineering quantities from the data. This information can be used to improve the design and characteristics of the structure, infer locations of damage and deterioration, and calibrate mathematical models of the structure.

The application of conventional monitoring systems to civil structures creates many obstacles and problems. Perhaps the single largest problem is the installation of these systems. Maintenance and environmental exposure are also recurring issues.

Installation

Given a structure to monitor and the financial resources to purchase a monitoring system, the first task is to install the instrumentation on the structure. Initially, this process seems straightforward, simply attach the sensors to the structure. A closer look reveals the problems with conventional monitoring systems applied to civil structures: the labor cost of installing the units in difficult locations and then routing the necessary cabling back to the centralized data acquisition system. For large structures, the cost of installation approaches 25% of the total cost [Lee, 1997]. For a typical modal analysis the installation time, whether for a building or bridge, consumes over 75% of the total testing time. In existing buildings, the installation process is complicated by the need to find adequate locations for the instrumentation and conduits through which to wire the system together. In bridges, the problem is further complicated by the skeletal nature of these structures. There is often no existing conduit or obvious way to route cabling [Farrar, 1996].

Maintenance

With the monitoring system installed, the concern shifts to the cost of maintenance and required readiness of the system. For bridges, the main concern and consequent cost is the exposure of the sensors and cabling to the external environment. Specifically, the repeated changes in temperature and humidity, and exposure to corrosive and direct sunlight significantly speed the degradation of sensors and cables. Given the already high cost of installation, returning to the structure on a regular basis to replace cables and sensors presents a formidable barrier to the practical application of these systems. For buildings, the problem is not the exposure to the external environment but to the other denizens of the building, namely rodents [Nigbor, 1997]. The coaxial cables of a conventional monitoring system that run in the conduits within a building can be damaged by rodents. A monitoring system designed with civil structures in mind should focus on mitigating the maintenance issues thereby increasing the reliability.

Additional Constraints

There are two additional constraints that conventional monitoring systems present. These problems are not specific to the civil monitoring scenario but to the architecture of the system itself. Often in experimental testing of structures, there is the desire to add several more channels of instrumentation after the initial installation. With a conventional instrumentation system, the desire to add one more channel to a system of 32 channels may require the purchase of an entire data acquisition module for the mainframe. This is the "One more Channel" situation. In effect, there is no ability to add capacity to the monitoring system.

One operational constraint is the long distances over which the analog signals travel. In industrial settings or exposure to thermal gradients, the analog signals may become noisy and degrade due to coupled noise sources near the cable path. Finally, given the nature of the instrumentation and the Unix workstation needed to transfer the data from the mainframe usually via a bus interface, the cost of these components has not decreased appreciably when compared to PC hardware.

SUMMARY

The primary object of the present invention is to develop a structural monitoring system that provides near real-time structural condition assessment for extreme events, as well as long term deterioration information to structural inventory managers. Achieving this dual purpose is critical, as structural inventory managers are unlikely to employ two distinct systems for condition assessment. Currently, no structural monitoring system exists that employs the same technologies and that provides the same potential benefits.

Given the current obstacles in monitoring civil structures, it is an object of the invention to provide a structural monitoring system that overcomes the disadvantages of the prior art. Accordingly, the present invention provides a system for monitoring structural properties of a large civil structure during structural overloading caused by a natural hazard or other extreme event. The system comprises a plurality of self-powered sensor units and a site master unit. Each sensor unit comprises a mechanical vibration sensor mechanically coupled to the civil structure and producing an analog electrical signal representative of mechanical vibrations in a localized area of the civil structure. A data acquisition circuit is electrically coupled to the mechanical vibration sensor and produces from the analog electrical signal a digital data stream representative of the mechanical vibrations. A digital wireless transmitter coupled to the data acquisition circuit produces from the digital data stream a wireless signal containing digital information in the digital data stream. The sensor unit is self-powered by an electrical battery supplying power to the data acquisition circuit and to the radio transmitter. The site master comprises a digital wireless receiver coupled to the wireless signal of each sensor unit and reproducing the digital information of each sensor unit. A microprocessor coupled to the receiver is programmed to collect and analyze the digital information from the plurality of sensor units. In addition, a more powerful computer may be interfaced with the master unit to download data that has been pre-processed and stored at the site master, and to provide more sophisticated data analysis.

In a preferred embodiment of the invention, shown in FIG. 2, a monitoring system comprises a collection of sensor devices 16 that can acquire and transmit data over a wireless data link to a central site master device 18 for analysis. In contrast with prior techniques, the data acquisition and a portion of the data analysis takes place at the sensor units 16 rather than at a central location. The Sensor Units 16 communicate with the Site Master 18 which coordinates the entire system. The design of the system solves the current set of problems with prior centralized monitoring systems. The monitoring system of the present invention is applicable to the two major types of hazards facing the built environment: long term deterioration from processes such as corrosion and fatigue, and extreme events from processes such as earthquakes that impart overloads to the structure.

BRIEF DESCRIPTION OF THE DRAWING FIGURES

FIG. 7 illustrates a packet exchange protocol used in a preferred embodiment of the present invention.

FIG. 8 illustrates a transmit data packet syntax used in a preferred embodiment of the present invention.

FIG. 9 illustrates a data protocol used in a preferred embodiment of the present invention.

DETAILED DESCRIPTION

Figure 1:
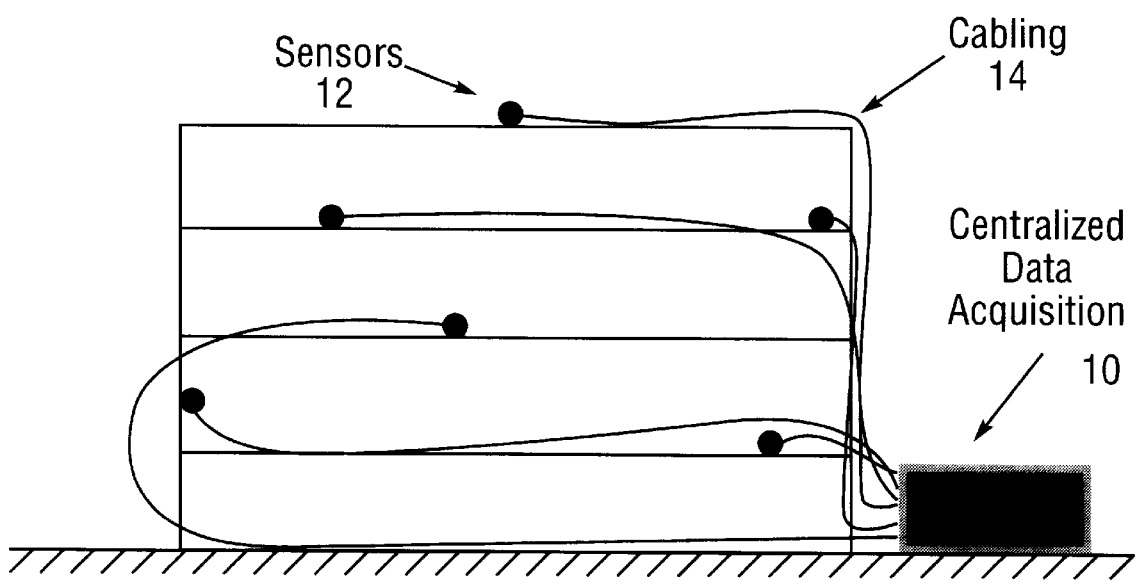
FIG. 1 shows a conventional monitoring system used for civil structures.
Figure 2:
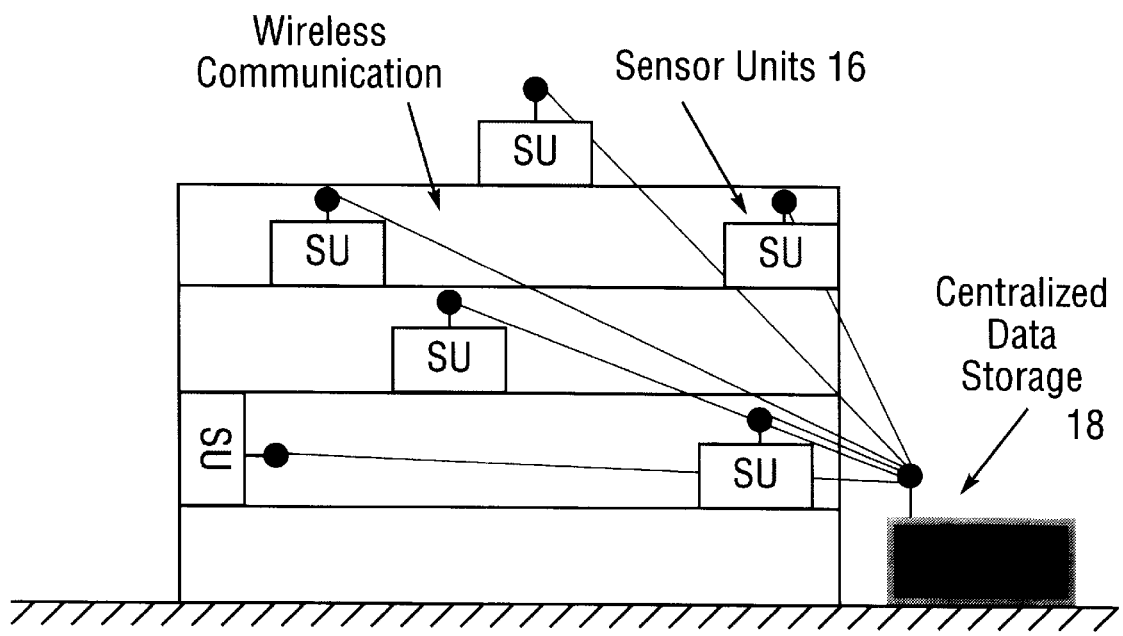
FIG. 2 shows a modular, wireless monitoring system according to the present invention.

The present inventors have recognized several technologies that have emerged and created the opportunity to develop a monitoring system that has new configurations and characteristics. In particular, three technologies contribute significantly toward creating new monitoring systems for civil structures: wireless communication, embedded systems, and miniaturized sensors.

Wireless Communication

The use of wireless communication for the transmission of data is a fundamental step toward the system designed in the preferred embodiment of this invention. Wireless communication is critical to reducing the instrumentation problems that civil structures present. Situations of large distances between instrumentation points, difficult routing and environmental exposure are better handled with a wireless communication system. The wireless communication technologies available commercially span a wide range of data rates and transmission distances. In the case of instrumenting civil structures, the ability to span distances of hundred's of feet and operate without license from the Federal Communications Commission (FCC) are desirable. In addition, features such as noise immunity and a small form factor are desirable in a field application. The technology with the most promise for the use of instrumenting and monitoring civil structures is the spread spectrum products commercially available, at present, operating in the Industrial, Scientific, and Medical Band (ISM) at 902–928Mhz. The FCC has allocated this frequency spectrum for the operation of devices with output power less that 1 watt. In performance, this technology is characterized by the ability to transmit data up to 1000 feet and at data rates, in commercial products, similar to computer modems. Given the expected data rates and distances between instrumentation points for this application, the spread spectrum wireless communication is well suited. It will be appreciated, however, that embodiments of the invention may use other types of wireless communication technologies well known in the art.

Embedded Systems

The use of computation in products of all types is rapidly growing. This is largely due to manufacturing efficiencies and microprocessor innovations in the semiconductor industry. The promise of computational power everywhere is the essence of embedded systems. Embedded systems are a growing field characterized by the increase in functionality of products through the use of computation and improved user interfaces. Embedded systems are different from PCs in that embedded systems may not have a traditional keyboard or monitor as input/output devices and usually have the capability to acquire digital or analog input and control other devices. In consumer products the objective is to hide the computational component and focus on the interface. Common examples of embedded systems include ABS brakes in cars, information kiosks, and keypad interfaces on consumer appliances. For example, the ABS braking system in a car takes input from the brake pedal and sensors that measure physical quantities such as wheel torque. The embedded microprocessor then calculates the appropriate braking response and controls the disk or drum brake mechanism, achieving near optimal braking results.

In the application to monitoring civil structures, the objective is to utilize the general input/output nature of embedded systems and the computational component to arrive at a wholly new architecture for monitoring. In particular, with a monitoring system based on wireless communication and embedded systems, it is possible to move the data acquisition of the system forward toward the sensors and to perform a portion of the computation locally in an embedded microprocessor and overcome several problems at once. This concept of pushing data acquisition and computation forward is fundamental to the design of the system of the invention and represents a departure from the conventional instrumentation design for monitoring civil structures. The use of embedded systems allows for the development of modular, decentralized data acquisition systems.

Miniature Sensors

The development of miniature sensors within the last decade has been largely achieved through advancements in the design and manufacture of mechanical as well as electrical components. For this description, miniature is roughly defined as achieving a form factor smaller than a 1-inch cube and preferably much smaller. One enabling trend in miniaturization of sensors has been for the use of silicon as the source of the mechanical system as well as the supporting electronics. This area of research is known as Micro electromechanical systems (MEMS).

MEMS hope to deliver more accurate and sensitive sensors in form factors and unit costs not previously possible with other technologies. There is a suite of applications from medical actuators to disk drive heads that stand to benefit greatly from the miniaturization of the mechanical sensor and coupling to electronics. The preferred embodiment of the present invention makes use of miniaturized sensors as a way to achieve a given performance level while reducing the unit cost and overall form factor of instrumentation. At the same time, it will be appreciated that other types of sensors may be used in alternate embodiments of the invention.

For the preferred embodiment, the measured physical parameter of interest is acceleration. This is due to the large body of research and data based on the use of acceleration for vibrational studies of structures. The measurement of acceleration is currently a significant field of research for the miniaturization of sensors. The applications of miniaturized accelerometers range from navigation to medical devices to space exploration. Commercially available miniature accelerometers fall into two classes: small piezo electric transducers or MEMS. Currently, the available piezo-electric accelerometers do not share the same coupling of the sensor electronics and economies of scale as the MEMS type accelerometers. Therefore, the sensing needs of this study will focus solely on the use of commercial MEMS type accelerometers.

Transduction mechanisms for MEMS accelerometers are based on either changes in capacitance or resistance. In general, capacitive MEMS transducers are lower in power, allow for closer integration of electronics, and are more immune to temperature changes than resistive MEMS designs.

Of direct interest to the preferred embodiment of this invention was departing from the use of large force balance accelerometers, approximately ten's of cubic inches, to miniature sensors with promising performance and economies of scale. One class of accelerometers is quite applicable for use in monitoring civil structures. Research initially conducted to achieve low cost and reliable air bag sensors for automobiles shows promise in application to structural monitoring. Typically, sensors for air bag systems are silicon micro-machined and designed for 50 to 100 g impacts over frequency ranges from 10 Hz to several kHz. By adjusting the mechanical structures that comprise the accelerometer, the useful frequency range can be shifted toward lower frequencies and acceleration ranges consistent with monitoring civil structures. Given the design constraints for the air bag sensor, these sensors are already low cost, small, and have interfaces designed for embedded microprocessors. Therefore, they are particularly suitable for monitoring civil structures.

Detailed System Design

For simplicity, the Wireless, Modular Monitoring System described as a preferred embodiment of this invention will be referred to as WiMMS. Those skilled in the art will recognize many obvious variations and alterations of the preferred embodiment described herein. In addition, it will be appreciated that numerous obvious improvements and/or adaptations of the invention to specific circumstances or uses are within the skill of the average engineer familiar with the art of structural monitoring.

The design of the Sensor Unit and the Site Master represent the functional building blocks upon which to develop appropriate monitoring strategies and analysis tools for the periodic and extreme event scenarios.

The general system design parameters of the preferred embodiment are shown in Table 1 below.

TABLE 1

| Design Parameter | Quantity or Quality |
| --- | --- |
| Sensor and Data Acquisition Resolution | 16 bits, or approximately 90 to 100 dB |
| Sensors per Sensor Unit | At least four |
| Wireless Communication Data Rate | At least 14.4 Kbps |
| Number of Sensor Units per structure | Greater than 10, less than 100 |
| Power Source | Battery, life expectancy in years |
| Form Factor | Less than 20 cubic inches |
| Data Acquisition Rate | At least 200 Hz |
| Computational Power | Ability to perform FFFs and similar tasks |
| Distance between Units | At least 100 feet |
| Data Logging Memory | At least 8 MB |
| Sensor Unit Synchronization | Within 0.1 milliseconds |
| Accelerometer Dynamic Range | Less than 0.001 g to a few g's |
| Near Real-Time Performance | Within 30 minutes |

Sensor Unit

A key component of this invention is the Sensor Unit. There are several observations that can be made which are the basis for the design principles of the Sensor Unit and the WiMMS.

The unit cost of computational and data acquisition components is negligible in comparison to the cost of sensors and wireless communication components.

The largest stumbling block is the transmission, through wire or otherwise, of the recorded sensor signals. There is a great need to alleviate the cabling problems on civil structures.

The sensing components are becoming much better in terms of packaging, resolution, dynamic range, and cost when purchased in large industrial quantities.

Few, if any, monitoring systems are tailored to the specifics of this application to large structures in terms of signal characteristics, sensor separations, the number of sensors, and the power requirements.

From these observations, it can be concluded that a small set of design principles for the Sensor Units of the WiMMS can be established:

1. Computation and data acquisition should be moved forward in the system toward the sensors themselves and away from a centralized data acquisition.

2. Communication between the units should employ technologies that lower, both the physical and economic obstacles associated with wired monitoring systems.

3. Some consideration of the packaging, power consumption, total unit size should be considered given the physical realities of installation. These considerations are however secondary to functionality in the first prototype.

Once the underlying trends have been established and translated into design principles, the goal is then to realize the above mentioned design principles in a hardware and software product to fulfill the promise of structural monitoring for civil structures. The following sections provide the details of the design and operation of the Sensor Unit.

Figure 3:
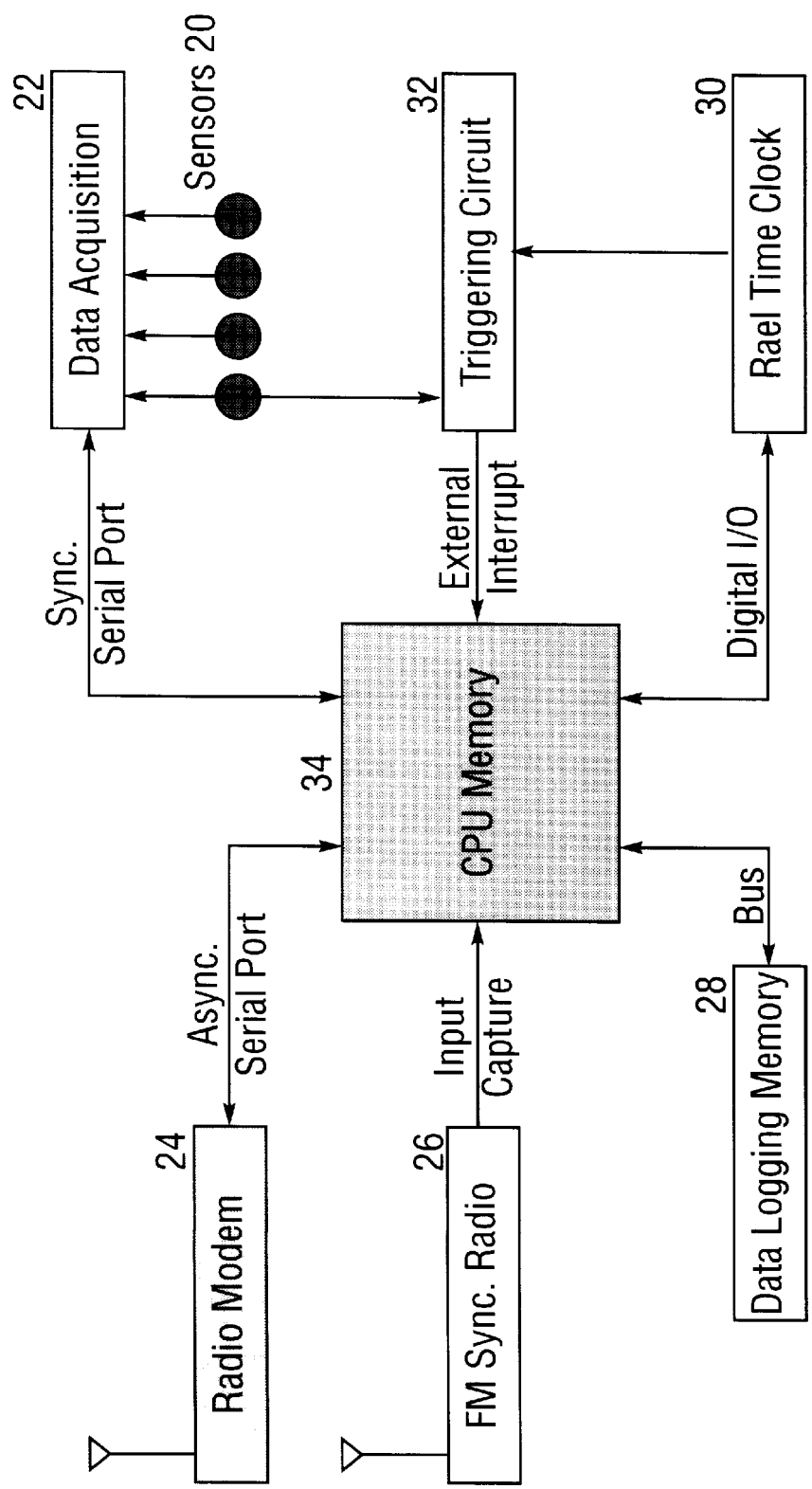
FIG. 3 is a block diagram showing the functional layout of a sensor unit according to the present invention.

Key features that differentiate the architecture used in WiMMS are its data acquisition at the local Sensor Unit and digital wireless communication. As shown in FIG. 3, the components of the Sensor Unit are a suite of sensors 20, data acquisition circuitry 22, a digital wireless transceiver (radio modem) 24, an FM synchronization radio 26, a data logging memory 28, a real time clock 30, a triggering, circuit 32, an embedded microprocessor 34, and a power source in the form of batteries (not shown). Tightly integrated, these components give birth to the Sensor Unit.

With the rapid advances in microprocessor design and silicon manufacturing techniques, it is now possible to include computational power in most commercial and consumer products. The net effect has been the rapid development of relatively high computational power, low cost microprocessors.

This invention leverages this by embedding computational power at each sensor location in the WiMMS. The microprocessor for this task was chosen based on several criteria:

- the availability of high level programming languages
- the number of hardware peripherals commercially available
- form factor or physical size
- electrical power requirements and features Based on those criteria, the Motorola family of 68HC11 microprocessors was chosen. The 68HC11 family supports a C programming environment, a wealth of peripherals, and has a convenient form factor and power saving modes. It will be appreciated that the particular choices of the microprocessor (as well as the radio modem and other components) for the preferred embodiment are based on what is currently available. It is anticipated that future implementations of the invention would undoubtably make use of state-of-the-art components that are not yet available at this time. The microprocessor is part of a prototyping board, NMIT-0022, that is manufactured by New Micros Inc.

Figures 4A, 4B, 4C:
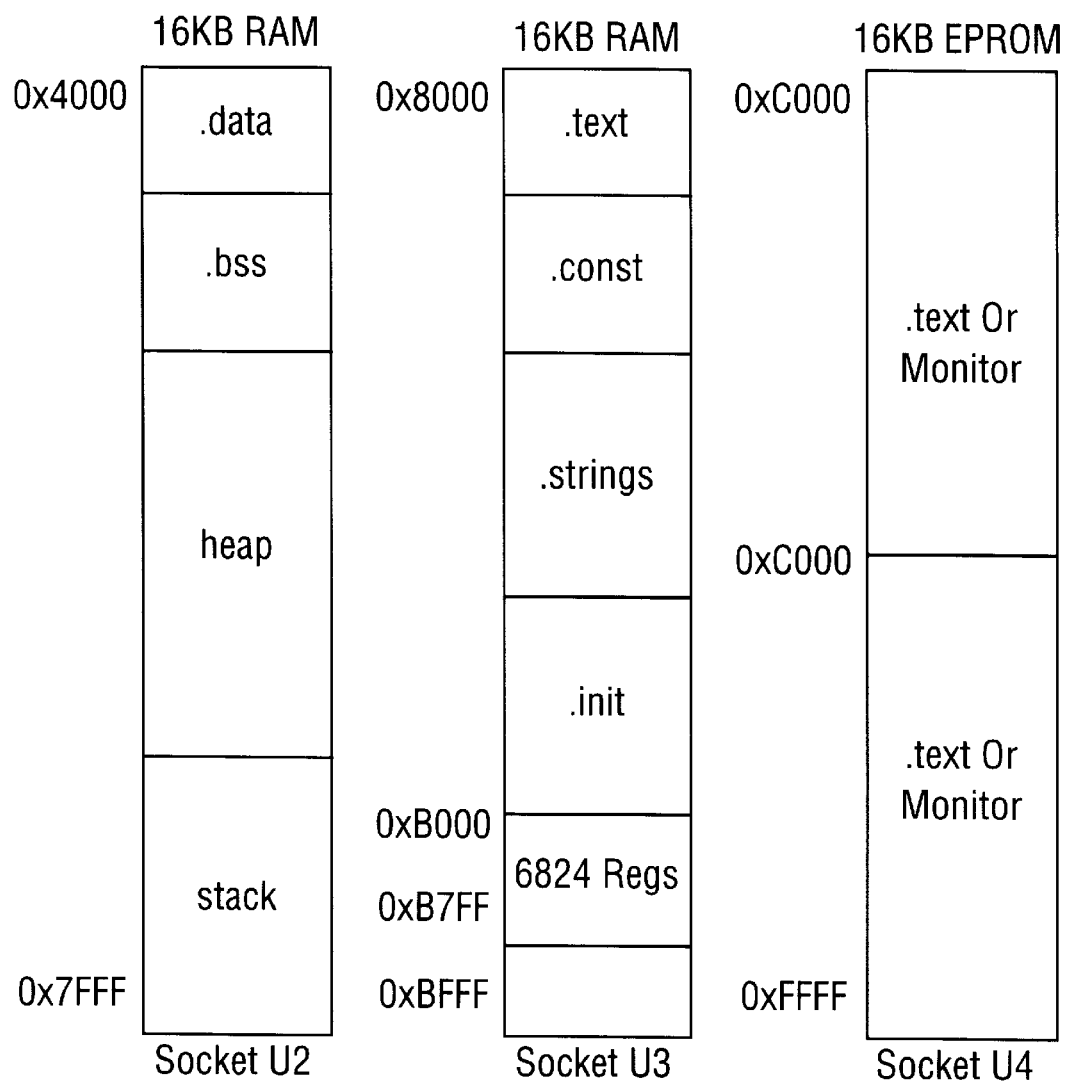
FIGS. 4A–4C are memory maps for the 3 sockets, U2, U3, and U4 in the NMIT-0022 board used in a preferred embodiment of the invention.

The microprocessor is a M68HC11E1 [Motorola, 1995] and includes a 68HC24 Port Expander. The main features of the NMIT-0022 are:

- 5 parallel ports, 38 General Purpose Pins (16 Bi-directional, 11 Input, 11 Output). These pins provide for output control and input capture of peripherals.
- 1 Asynchronous Serial Port, RS-232 to communicate over a standard interface
- 1 Synchronous Serial Channel, TTL for high-speed data transfer.
- 8-bit counter, 16-bit timer, to count and time events
- 3 input captures, 5 output compares, for capture and comparison of external events
- 64K address space for data and program storage
- three memory sockets with flexible address decoding for program data
- Battery backup circuits for memory Application development on small microprocessors is quite different than on other computational platforms. On the Motorola 6811, care must be taken with each variable and with the structure of the programming to ensure that applications will store and execute properly. Therefore, a discussion of the layout of the memory map and its design is warranted. The M68HC11E1 can address 64KB (0x0000–0xFFFF) of combined data and program space through 3 sockets located at the bottom of the NMIT-0022 board. The configuration used in the preferred embodiment of this invention calls for the use of the 3 sockets, U2, U3, U4, for three 16 KB RAM and EPROM chips to start at 0x4000, 0x8000, and 0xC000, respectively. This will give 32KB of program and data space and a 16KB EPROM that could be used for additional non-volatile program space. FIGS. 4A–4C illustrate where the various program segments are located when the Sensor Unit is programmed and operational.

The code segments, such as data and .bss, are the resulting machine code sections after the compile and link processes. Table 2 shows the relationships between the various sections of the code that runs on the Sensor Unit and the high level programming abstractions that create the various sections.

TABLE 2

| Memory Code Section | Function |
| --- | --- |
| .bss | uninitialized global and local static variables |
| .data | initialized variables |
| Heap | Dynamically allocated memory |
| Stack | used for nested or interrupted temporary storage |
| .text | Program |
| .const | Constants |
| .strings | Initialized strings |
| Monitor | simple programming interface for debug and download |

The complete memory map includes the 0x000 to 0x3FFF range used for the functions and devices mentioned in Table 3.

TABLE 3

| Hex Address | Function or Device |
| --- | --- |
| 0x0000 - 0x01FF | On-Chip RAM |
| 0x0200 - 0x1FFF | EMPTY |
| 0x2000 - 0x2007 | Memory Expansion Board |
| 0x2008 - 0x2FFF | EMPTY |
| 0x3000 - 0x3003 | Serial Port Board |
| 0x3004 - 0x3FFF | EMPTY |

Wireless Communication

The purpose of the digital wireless communications component is to provide a logically connected network of Sensor Units that can communicate and share information without the wires and cables of traditional instrumentation systems. The communications task of the Sensor Unit is accomplished with the use of commercially available wireless modems. Proxim Inc., of Mountain View, California View manufactures a suite of wireless modems. Specifically, the original equipment manufacturer (OEM) version of the Proxim Proxlink MSU2 [Proxim, 1994] is used. The MSU2 is a direct sequence spread spectrum product that operates in the Industrial, Scientific, and Medical (ISM) band between 902–928 MHz. Therefore, they require no FCC license to operate, have reasonable signal penetration through civil engineering materials, and are highly immune to interference. These features make the Proxlink particularly suitable for use in the WIMMS prototype. A summary of the Proxlink features is given in Table 4.

TABLE 4

| Feature | Details |
| --- | --- |
| Maximum Range | 1000 feet |
| Maximum Data Rate | 19.2 Kbps |
| Modes of Operation | Pass Through, Broadcast, Packetized |
| Packetized Mode | Transmission, configuration, power management |
| Antennas | High Gain and Omni Directional |
| Collision Control | Carrier Sense Mult. Access w/Collision Avoidance |
| Electrical Interface | RS-232, 9 pin D female |
| Data Format | 8 data bits, No parity, 1 stop bit |
| Data Flow Control | CTS, DSR, XON/XOFF |
| Voltage | 9 volts (regulated internally) |
| Output Power | 300 mW |
| Transmit Current @ 5V | 130 mA |
| Receive Current @ 5V | 140 mA |
| Device Standby Current @ 5V | 1 mA |
| Package Size | 4" x 0.5" x 0.75" |
| Weight | 5.5 ounces |
| Operating Temperature Range | −20 C. to +60 C. |
| Message Format Options | Line Length, Delimiters, and Input Time-Out |
| Number of Channels | 3 |
| Raw Channel Data Rate | 242 Kbps |
| Maximum Packet Length | 576 Bytes |
| Number of Internal Buffers | 20, dual purpose, input and output |

Spread spectrum products are so named because they spread the transmitted signal over a wide range of the spectrum. Specifically, the MSU2 divides the 902–928 MHz band into 3 non-overlapping channels each with 160 individual frequency bands. The MSU2 therefore avoids concentrating power in a single narrow frequency band, making it less sensitive to narrow band interference. Narrow band interference is commonly associated with the operation of industrial machines, other radio frequency devices, and electrical transients caused by man-made or natural phenomena. For a particular channel, the MSU2 alternates among these 160 frequency bands following the Direct Sequence Spread Spectrum (DSSS) Technique. In an exemplary DSSS technique:

Each data bit becomes a string of bits (chipping sequence) transmitted at a constant frequency
chipping code:
10110111000=0
01001000111=1
spreading ratio=chipping bits per data bit=11
high spreading ratio: greater immunity to noise
low spreading ratio: higher overall data rates
data bits: 0 1 1 0 appear to the recieving MSU2 radio as

| 10110111000 | 01001000111 | 01001000111 | 10110111000 |
| --- | --- | --- | --- |

DSSS avoids excessive power concentration by spreading the signal over a wider frequency band. Each bit of data is mapped into a pattern of data "chips" by the transmitter. At the destination, the chips are mapped back into a data bit, recreating the original data. On a given channel, the radios follow a prescribed sequence to alternate between the 160 bands. Therefore, transmitter and receiver must be self-synchronized to operate properly. The synchronization of the Proxuink radio modems is handled in the firmware of the product.

The ratio of chips per bit is called the "spreading ratio". A high spreading ratio increases the resistance of the signal to interference. A low spreading ratio increases the net bandwidth available to a user. Most manufacturers offer a spreading ratio of less than 20. The Proxlink MSU2 uses a spreading ratio of 11.

A study of the range of the Proxtink in typical settings for this application was conducted. It was found that line-of-sight distances, such as those associated with monitoring systems for skeletal structures like bridges and towers, approach 800 feet. For typical buildings and other interior settings, communications distances of greater than 100 feet were achieved. This implies an inter-story maximum separation of roughly 8 stories.

Data Acquisition

The development of a custom data acquisition system was necessary to achieve the required performance of the Sensor Unit. The design requirements for the Sensor Unit call for a wide range of possible sensors and electrical configurations and interoperability with the Motorola Serial Peripheral Interface (SPI) on the 68HC11E1. None of the commercially available data acquisition subsystems are appropriate for this application in terms of power consumption, communication interface, or sensor interface. The integrated circuit (IC) solution to the data acquisition problem was found in a new component designed for another field entirely, the medical industry. This new IC, the Harris H17188IP [Harris, 1996], fulfilled many of the desired features of the implementation and was therefore designed and integrated into a single 4-layer printed circuit board (PCB) to complete the data acquisition subsystem.

The Harris H17188IP is an 8 channel, 16 bit, 240 Hz, sigma-delta analog to digital converter. It was specifically designed for low frequency physical and electrical measurements in the medical field. As a sub-system, it directly supports the overall design principles of moving computation and data acquisition forward toward the sensors and away from the central controller. The H17188 was designed with support for the Motorola SPI and low software overhead in mind. The H17188IP has convenient features such as line noise reduction; however, it has no internal anti-aliasing filter. A 4-layer printed circuit board to integrate the Harris H17188IP and its supporting ICs was designed and manufactured in small quantity. A 4-layer PCB was necessary to ensure that the data acquisition was reliable and as free from noise as possible. With 16 bits of data divided a 0–5 volt range each binary state is roughly 76 micro-volts. Ideally, sensors that interface with the H17188IP would support voltage outputs with similar ranges.

There were a number of considerations for the design of the data acquisition board. Data acquisition boards are inherently mixed signal (analog and digital). Handling these two types of electrical signals places constraints on the position of digital and analog components. In this design, the digital and analog sections of the IC are roughly divided into the upper and lower halves of the chip, respectively. Pins 1–8 and 31–40 are digital pins carrying either 0 or 5 volts. The remaining pins are analog.

Figure 5:
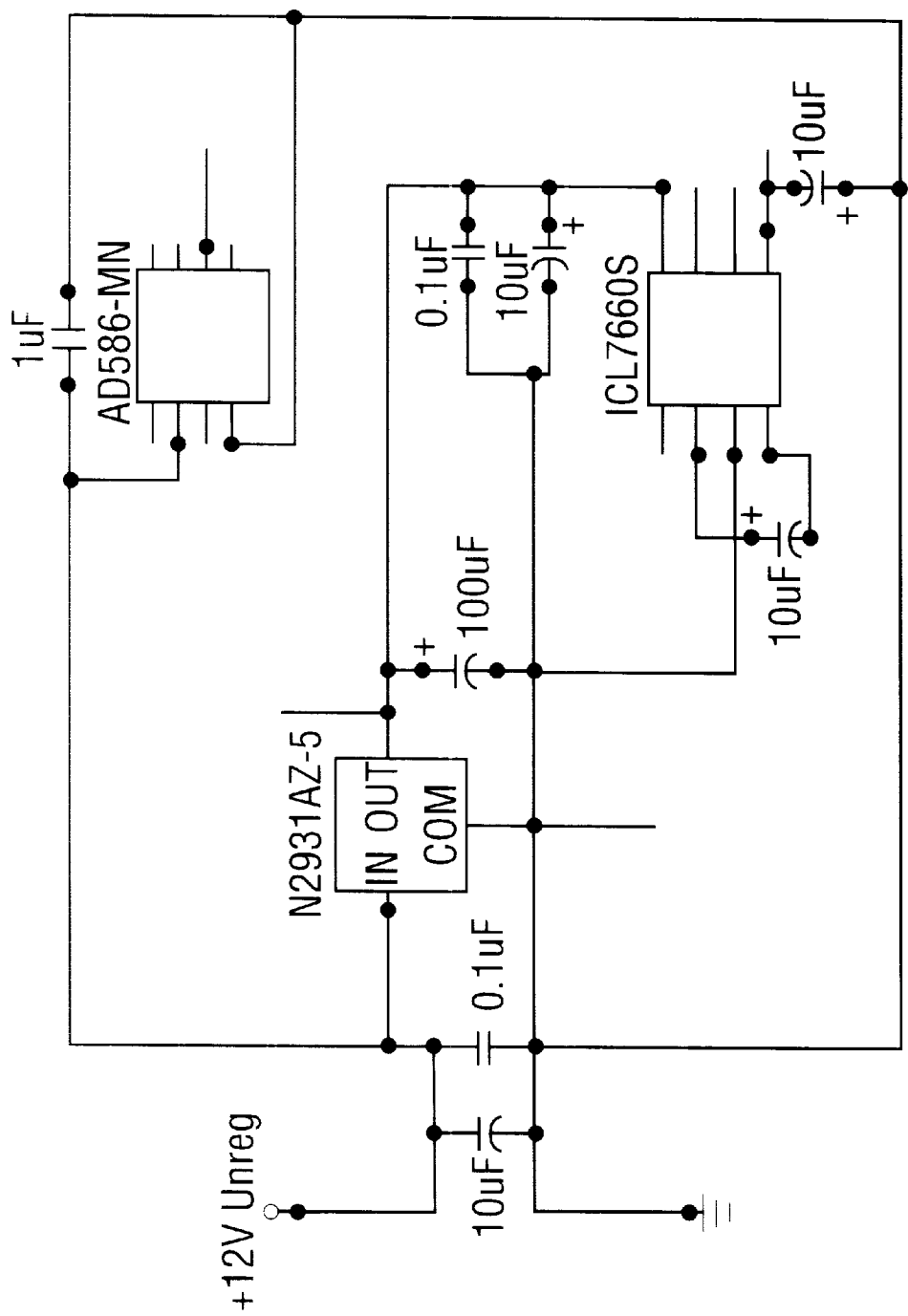
FIG. 5 is a schematic diagram of an analog voltage supply, regulation, and reference circuit used in a preferred embodiment of the present invention.

The H17188IP needs both voltage regulation and reference for proper operation. Specifically, the designer must supply 0 and 5 volts to the digital parts of the IC as well as −5, 0, and 5 volt regulated and 5 volt reference to the analog side. This was accomplished through the design of separate regulation and reference circuits. The digital portion of the data acquisition board is supplied the digital 0 and 5 volts from the 68HC11. This ensures that the logic levels are consistent with the expected voltage levels at the 68HC11. The analog portion of the data acquisition board requires an unregulated voltage source, such as a battery pack, with greater than 9 volt supply. The first component in the power regulation is a 5V regulator IC, National N2931AZ-5. The output of the N2931AZ-5 is a regulated 5V output. This 5V output is then sent to two locations to 1) supply the −5V necessary for the internal operation of op amps in the analog portion of the H17188IP and 2) the 5V reference necessary for the proper conversion of the analog signals. FIG. 5 shows the circuit schematic for the generation of the voltage regulation and reference.

Careful consideration was given to the location and layout of power and ground planes to ensure that the operation of the data acquisition board is as close to the performance of the ICs as possible. In general, it is better to create as large a ground plane as possible to provide the highest stability and immunity to noise. In this design, the ground planes were made as large as possible without compromising the unfilled area where the analog sensor signals interface.

Further, research into PCB design pinpointed the need to correctly orient ICs so as to minimize the likelihood of routing analog and digital traces near each other [Henke and Ohnstad, 1991]. While large system designs can be optimized with the use of sophisticated PCB layout software, the design used for the preferred embodiment of the invention has only a few components that required hand layout.

Finally, there was consideration as to the connectors that would be used to connect the data acquisition board to the 68HC11 and the sensors. A 4 pin locking Molex connector was used to provide positive, keyed contact in an easy to remove connector.

Sensor Selection

For the preferred embodiment of this invention, the physical parameter measured by the Sensor Units is acceleration. Acceleration measurements are commonly used in the ambient and forced vibration analysis of civil structures. It is noted that the preferred embodiment of the present invention seeks to fulfill a specified performance profile without primary concern as to the particular manufacturing or underlying transduction mechanism of the sensor. The preferred embodiment employs miniature accelerometers that are silicon micro-machined. Silicon micro-machined sensors are commonly referred to as micro electro-mechanical systems, or MEMS. In particular, the acceleration based sensors used in the preferred embodiment are variations on air-bag sensors used in the automotive and aircraft industries. The transduction mechanism of the sensors is based on an open loop capacitive sensing element.

MEMS type sensors have several advantages over conventional accelerometers or seismometers that are based on a traditional force-balance approach. First, the form factor is significantly reduced. Second, there are attractive economies of scale with MEMS type sensors; unit costs become negligible in large quantities. Third, with the ability to integrate the physical and electrical components on the same silicon die, temperature compensation and signal conditioning can be done local to the sensor. Finally, for application in structural monitoring where the seismic or environmental noise floor is roughly 50 micro-g's [Evans, 1998], these accelerometers have demonstrated the ability to meet this performance measure at attractive unit costs. The sensor that was used for validation experiments is the EG&IC Sensor 3145 2 g accelerometer. The 3145 is an instrument grade accelerometer with full signal conditioning and temperature compensation. It has a sensitivity of 1 V/g and a voltage bias of 2.5V. Therefore, +/−2 g signal falls within 4.5 to 0.5V. This range is well suited with the Harris H17188 unipolar mode which accepts 0–5V input.

Sensor Unit Synchronization

One of the design challenges was the synchronization of the Sensor Units. In order to do dynamic time series analysis, which is the basis for the majority of multi-point analysis, a scheme to synchronize the Sensor Units was necessary. The Proxim Proxlink MSU2 radios could not be used to perform synchronization because the media access is controlled by the internal firmware. In other words, given the current radio modem there is no way to directly control the timing of the transmissions.

The synchronization approach taken was to employ a transmitter and set of receivers. The hardware component is manufactured by Abacom Technologies of Etobicoke, Ontario, Canada. The TXM-418-F-5 Transmitter and its compliment, the SILRX-418-F [Abacom, 1996], are frequency modulated (FM) components that operate at 418 MHz. They support a data rate of 10 Kbps, implying a bit time of 0.1 milli-second. The transmitter is located at the site master and interfaces through a standard serial port. Each Sensor Unit has a receiver to listen to the synchronization pulse that accompanies each time series recording. The incoming signal is passed to an input capture that checks the timing of the incoming waveforms and verifies the sequence in software. With this bit timing, it is possible to implement a software solution to time calibrate the Sensor Units before periodic monitoring and after an extreme event.

Liquid Crystal Display (LCD)

Embedded systems can be difficult to debug because of a frequent lack of display devices. For the designer, the debugging interface is usually a series of LED's or network interface which itself may be a problem. This difficulty is compounded when there is communication among embedded devices as the source of the problem is often unclear. In general, the multi-point embedded systems can be non-deterministic in their operation; often the system crashes due to the subtle interaction of many units. The operation is non-sequential and typically based on a state transition model. To facilitate the debugging of the Sensor Units, both for communications and the other subsystems, it was necessary to implement a 2 line, 16-character LCD display. The use of this debugging and information interface is invaluable in field tests. A commercial implementation of the invention, however, may not require the LCD display.

Site Master

At the site master, the only hardware necessary is the wireless modem and its packaging, including an antenna and power supply. The Proxuink MSU2 interfaces to the Site Master through a standard 9-pin serial port. In all cases, a whip antenna suitable for the 902–928 MHz band was used.

Software Design

Figure 6:
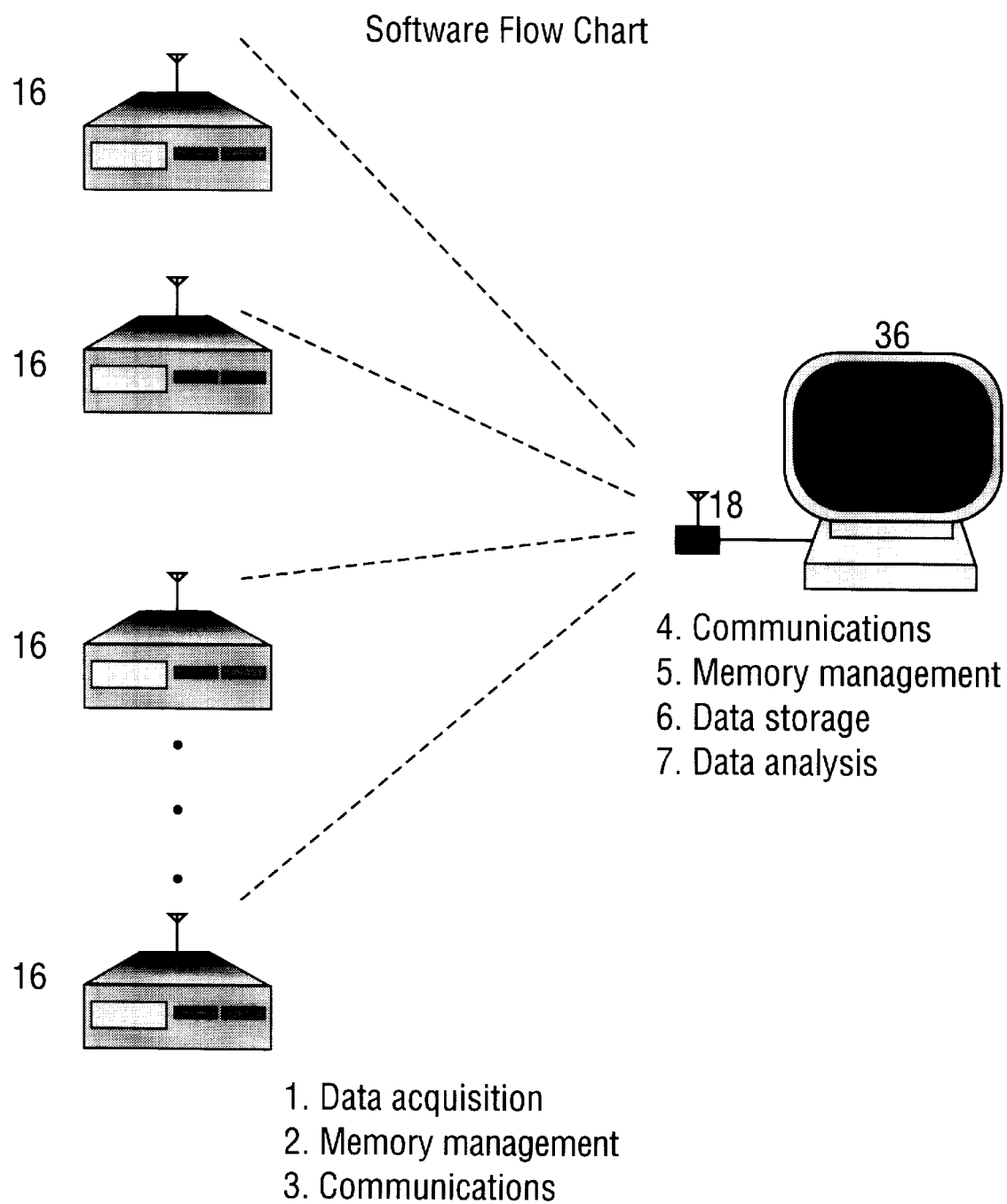
FIG. 6 is an overview of the distribution of software functionality in a preferred embodiment of the invention.

The design of software for the WiMMS was done primarily on two platforms. In both cases a high-level programming language, C, was used. Every effort was made to have a modular and layered approach to the software development. For example, there are independent hardware level serial port drivers for the 6811 and the PC, but the packet checking layer is identical. Where possible, information hiding was employed so that the upper application layers are abstracted from the transport and physical layers of the software. This would allow the packet protocol to run on any device with an appropriate physical layer interface. The details of the software design for both the site master and the Sensor Units are described in the following sections. The software tasks are broken down into steps and illustrated pictorially in FIG. 6, where a personal computer (PC) 36 is programmed to perform complex data analysis and storage.

Site Master

The Site Master software was developed on a commercial PC under the Linux 2.0 Unix operating system. At the Site Master, there are two main software tasks. First, the Site Master, through its attached radio modem, must communicate and more importantly, coordinate the functions of all of the Sensor Units. Second, it must intelligently archive and pass off the recorded data from each Sensor Unit to other programs for further analysis.

The site master runs a nearly identical protocol to the Sensor Unit. The slight differences are that the Site Master is the initiator of all communications in the system; allowing the Sensor Units to merely do as they are told and minimizing the total communications as the number of units increase. Another difference is the archival of the received sensor data. Each Sensor Unit is uniquely identified in the system by its radio address. This allows the Site Master to know where each unit is and to archive the data by Sensor Unit. Therefore, analysis programs and other agents that use the sensor data know its origin.

Sensor Unit

The Sensor Unit software was developed through a design environment, Ideal [Creative Engineering Applications, 1996], on a PC with a target Sensor Unit running a freely distributed program monitor called BUFFALO. BUFFALO allows for the storage and execution of programs that are complied and linked for the 6811 microprocessor. The compiler, linker, and debugger are produced by Introl Corporation, [Introl, 1994]. A serial cable provides the communication interface between the PC, where the code entry, compile, and link processes occur, and the 6811 where the executable program runs.

TABLE 5

| Data Acquisition | Memory Manag. | General Purpose | Communications |
|---|---|---|---|
| A2d.c | Buffers.c | Node.c | Serial.c |
| Sync.c | MMExpand.c | Lcd.c | Proxim.c |
|  |  | Launch.c | Packet.c |
|  |  |  | Protocol.c |

Communications

Perhaps the single largest module in the software development was the design and specification of a packet protocol that would be 1) simple enough to implement on a small microprocessor like the 6811 and 2) robust and versatile enough to handle the various types of data and applications this system. The packet protocol is built upon the low level packet structures supported by the Proxlink MSU2. The general packet structure, PPX-1, supported by the MSU2 is illustrated in FIG. 7. In short, the PPX-1 packet "wrapper" provides simple error detection without error correction.

Within the PPX-1 protocol is the Modem Command Protocol (MCP). The MCP is the inner command protocol that provides features such as "Transmit Data Packet", "Go To Standby", "Initialize Modem", etc. With the exception of one command, Transmit Data Packet, all of the commands are used exactly as described in the Proxim OEM specifications [Proxim, 1994].

The Transmit Data Packet structure is simple in design and powerful in application. The syntax of the command is shown in FIG. 8. The Transmit Data Packet command provides the Proxlink with the 4 byte unique destination address and a sequence number for upper layers of software to use to synchronize and coordinate incoming packets that may arrive out of order. The total overhead from the PPX-1 wrapper is 6 bytes plus 8 bytes from the MCP Transmit Data Packet Command for a total of 14 bytes of Proxlink overhead.

Within the "System Protocol" section of the MCP Transmit Data Packet command is the protocol designed for this embodiment. The system protocol starts with a sequence number for upper layers of software on the receiving unit to use. Next, there is a packet type byte that lets the receiving unit know what kind of data it is receiving. The following two bytes are unused and are available for future protocol features. Incidentally, they are required by the Intel microprocessor as the memory bus writes data in words (32-bit). Then, there are 4 bytes of offset and a 4-byte length field. These two fields, offset and length are used in transmitting data samples to specify where and how many bytes of a data request are to be filled with data. This syntax and procedure is loosely related to the File Transfer Protocol (FTP) and shown in FIG. 9.

The second byte, the packet type, is the identifier for each packet. The system protocol understands the 15 types of packets identified in Table 6 and has the future capability of recognizing 256 types of packets.

TABLE 6

| Packet Type Identifier Byte | Packet Type |
|---|---|
| 0x00 | Force Sensor Unit Ping |
| 0x01 | Sensor Unit Ping |
| 0x02 | Request Data Length |
| 0x03 | Request Data from Sensor Unit |
| 0x04 | Site Master acknowledging receipt of ping |
| 0x05 | Sensor Unit Die |
| 0x06 | Reset Sensor Unit |
| 0x07 | Sensor Unit Start Sampling |
| 0x08 | Sensor Unit Stop Sampling |
| 0x09 | Ping Acknowledgment |
| 0x0A | Request Data Length Response |
| 0x0B | Data Samples |
| 0x0C | Sensor Unit Die Acknowledgment |
| 0x0D | Sensor Unit Start Sampling Response |
| 0x0E | Sensor Unit Stop Sampling Response |

Figure 10:
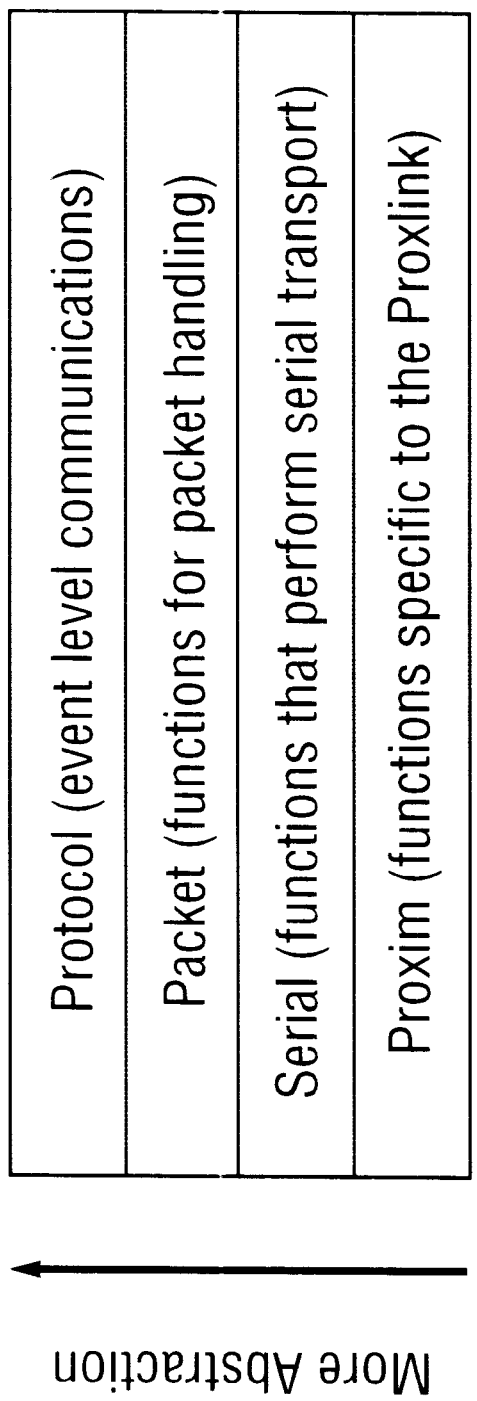
FIG. 10 illustrates a layered communications technique implemented in a preferred embodiment of the invention.

There are several software modules that share the communication responsibility in the WiMMS. FIG. 10 illustrates the layered approach used in the preferred embodiment of the invention.

The Proxim module performs functions specific to the Proxlink MSU wireless modem. Examples of this include the hardware specifics for reset and standby commands. The Serial module provides functions that enable the serial transport of packets in and out of the Sensor Unit. The Serial module works via an interrupt driven receive function and a polling based transmit function to provide packet transport. The Packet module is responsible for the syntax of packets. Error detection and packet construction occurs at this level. Finally, in the module most abstracted from the hardware, the Protocol module, event driven commands are interpreted and appropriate responses made. In effect, the incoming communications consist of a process moving up the modules of FIG. 10. Conversely, outgoing communications for the Sensor Unit follow the opposite path.

Data Acquisition

The design and development of a data acquisition board for the WiMMS is a key part of the implementation. In particular, the H17188IP is well suited to portable, multi-channel data acquisition and control via the Motorola SPI.

Figure 11:
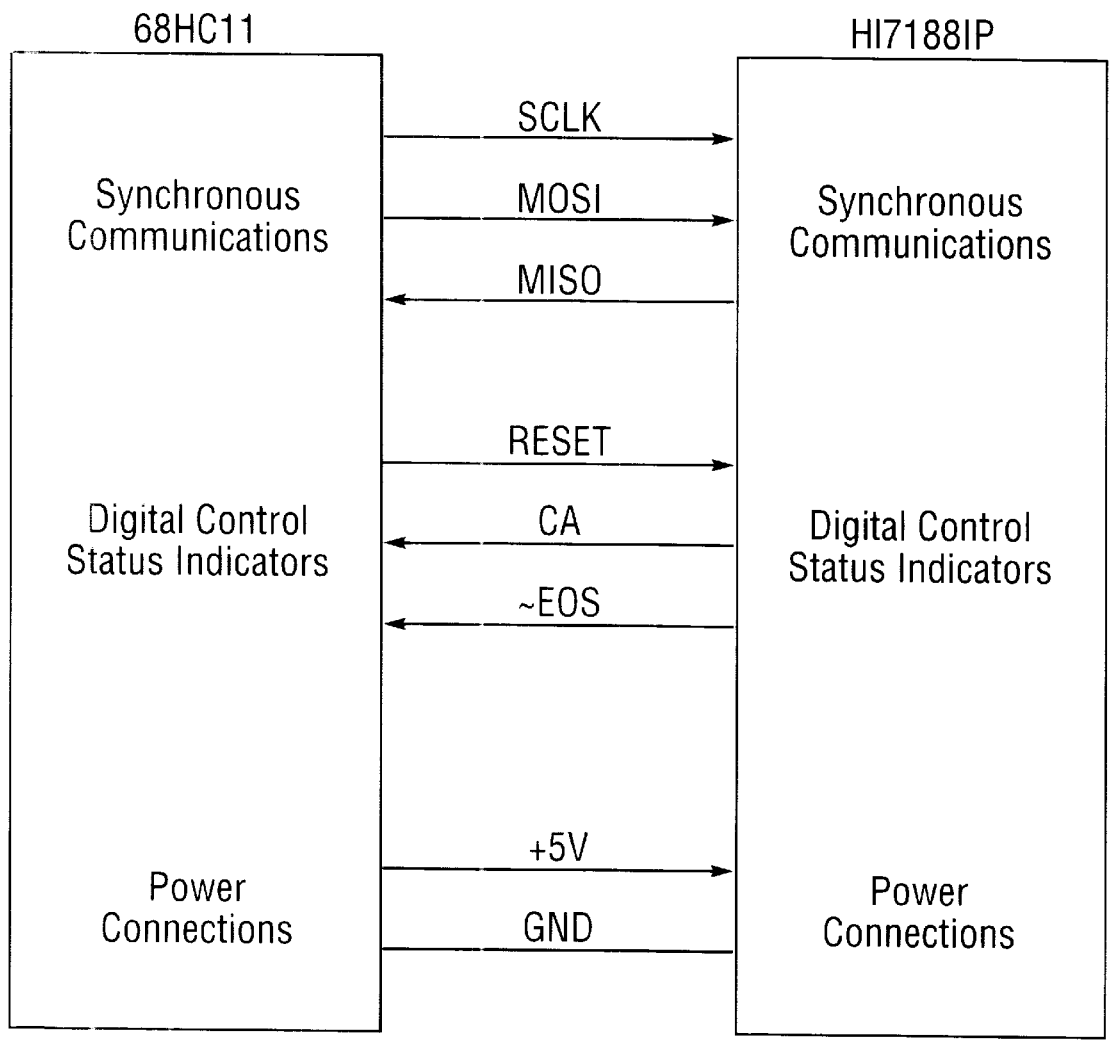
FIG. 11 is a schematic diagram of a data acquisition interface used in a preferred embodiment of the present invention.

The H17188IP has a set of registers that are accessed through a three wire, serial communications on the 6811 Synchronous Serial Port. This port on the 6811 is capable of synchronous communication speeds up to 2 Mbps. The complete interface between the 6811 and the H17188IP is shown in FIG. 11.

The 6811 is the communication master and supplies the serial clock (SCLK). The Master In-Slave Out (MISO) line and its complement MOSI (Master Out-Slave In) line carry valid serial information when synchronously clocked by the SCLK. The next 3 lines are for digital control of the H1788IP and for status indication in the data conversion process. The RESET line allows the 6811 to restart the H17188IP if communications become unsynchronized or if the H17188IP does not respond to commands. The CA status indicator line signals to the 6811 that the H17188IP is calibrating its channels and that data taken will be invalid. The ~EOS line, where ~ represents the logical NOT operation, indicates that the End of Scan is complete when low. In effect, this line signals that valid data is ready to be read over the three line SCLK, MISO, and MOSI interface. Finally, this digital portion of the H17188IP is supplied by the on-board 5V supply from the 6811.

The operation of the H17188 is done through several steps upon power-up. First, the 6811 must be configured for the proper communication parameters such as signal phase and SCLK rate. Then communications with the H17188IP are initiated with a reset to the H17188IP. The H17188IP channel control registers must be configured for the type of conversions to be made including the number and the order of conversion for the eight channels. Next the channel conversion constants, calibration data for each sensor on each channel, are written to a set of calibration registers. Finally, a complete read and verification is made before the initialization of the H17188IP is complete.

Once the H17188IP is configured, initiating conversion and reading the data converted on successive conversion is accomplished by writing a request for conversion to the H17188IP and awaiting the ~EOS signal that data is ready to be transferred to the 6811. This procedure is repeated for each data conversion. The H17188IP has its own clock and conversion cycle so that conversions stream out at a constant 240 Hz rate, regardless of the requested data rate. Data that is unread is simply overwritten on the next conversion. Once the data is read from the serial interface, it is stored in the data acquisition software module until conversion is complete on the entire data buffer requested and then returned to the memory management software for storage and processing.

Another feature in the data acquisition is the synchronization of the Sensor Units after the successful capture of data. The Sync module, uses an Input Capture interrupt to detect the incoming signals from the transmit radio on the site master. The site master transmits a series of four hexidecimal 0x55's that form an oscillating digital pulse train with the bit pattern 01010101 for each of the four bytes. The FM radio used for synchronization requires that data be load balanced; this translates to balancing the number of logical 0's and 1's that are transmitted. The FM radio needs this for proper operation of its analog components. By sending 40x55's to the site master synchronization radio, the simple FM radio analog components are "primed" and proper synchronization can be based on numerous falling and rising edges of the later 0x55's in the pulse train. By controlling the time tolerances for the acceptance of the 0x55's that are transmitted, the synchronization tolerance can be specified. Since the pulse train is generated by the serial port in the site master and checked by the Input Capture line IC3 of the 6811, tolerances within several microseconds can be accomplished.

Memory Management

Critical to the operation of the Sensor Unit is the careful management of its limited memory resources. With protocol packets of 576 bytes and data buffers in the 1000's of bytes in a total random access memory space of 64 Kb, it is imperative that simple robust memory management be employed. Two memory management software modules, Buffers and MMExpand, are developed to handle the communications and data logging of the data received from the H17188IP, respectively.

The Buffers module creates a simple stack arrangement of communication buffers. When the protocol module of the communication sub-system needs to create a packet it first turns to the memory management module, Buffers, to find a pointer to an unused packet. Upon successful completion and acknowledgment of transmission of a packet to the radio, the packets are then checked back into the Buffers module for reuse.

The MMExpand module is used with the NMIX-2001 and NMIX-2002 memory expansion and memory decoding cards manufactured by New Micros Inc., respectively. With this module, the data that is acquired from the H17188IP can be logged onto the NMIX-2001 through 8 registers that appear starting at memory address 0x3000 of the 6811.

General

There are three general software modules that provide basic functionality to the Sensor Unit. The Launch module initializes the various sub-systems, communications, data acquisition, and memory functions. The LCD module, is the hardware driver for the 2 line LCD display that is connected to the Sensor Unit. Through this display, operating and debugging information can be presented. The last module, Node, is the highest level of software in the Sensor Unit. It calls all other functions and provides the global software structure of the Sensor Unit.

Expected Performance in the Extreme Event

Figure 13A:
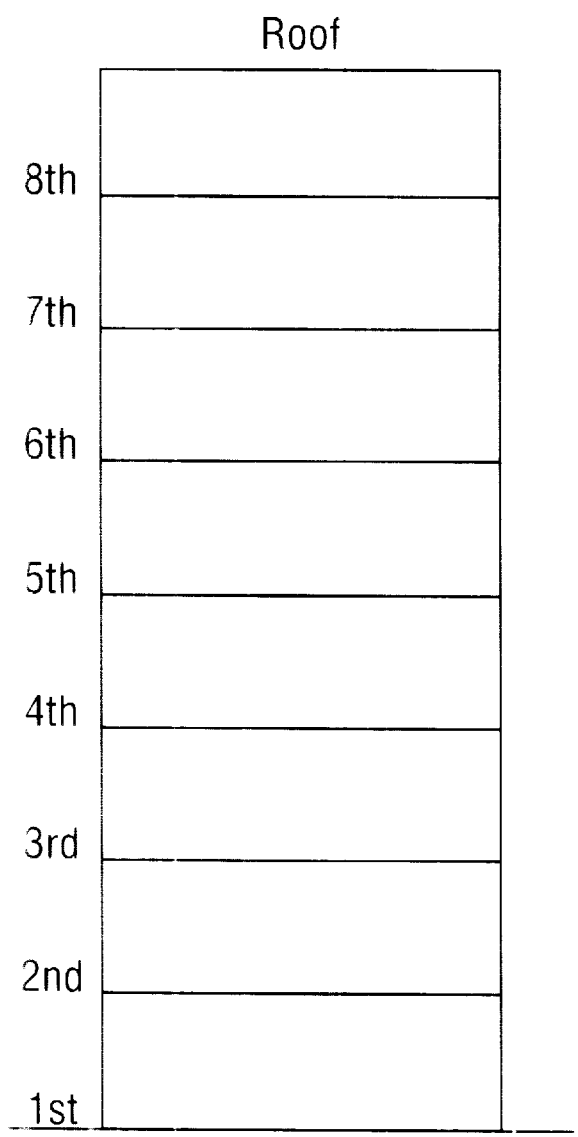
FIGS. 13A–13C depict a hypothetical 8 story building, showing placement of sensors on the various floors.

With the choices for the Sensor Unit components and subsystems made, it is possible to calculate the expected performance of a hypothetical installation of this system as proposed in FIG. 13A. With a per channel sampling frequency of 240 Hz at 16 bit resolution the total incoming data is 3840 bits per channel per second. This is the data rate for the 24, single channel accelerometer Sensor Units on the upper floors of the hypothetical 8 story building of FIG. 13A. The Sensor Unit at the ground floor has three channels of acceleration and therefore a data rate of 11520 bits per second. Assuming that the earthquake and the free response ring down of the structure last 120 seconds, the total data stream to transmit to the site master is 11,197,600 bits. The 24 upper floor Sensor Units each have 460,800 bits to transmit and the ground floor Sensor Unit has three times that, or 1382400 bits. Using the protocol described herein with an overhead of 26 bytes per 576 byte packet, and assuming a 30% overhead for queuing the Sensor Units and expected packet collisions, the total time of data transmission is slightly less than 14 minutes. Adding the two minutes for the actual earthquake, the entire process of triggering, capturing, transmitting, and archiving the recorded data should consume roughly 16 minutes.

The proposed earthquake response analysis procedures are relatively simple compared to the periodic analysis, and are expected to run in less than 4 minutes on a Pentium equipped PC for the hypothetical 8-story building presented. This implies an end-to-end time for the entire monitoring system in the earthquake case of approximately 20 minutes for a typical installation.

Expected Operating Life

Once installed on a structure, the Sensor Unit is in one of two states: 1) the background state, awaiting an alarm for periodic monitoring or earthquake and 2) active state, acquiring data and transmitting data to the Site Master. For the purpose of this discussion, it is assumed that the batteries in the Sensor Unit will be replaced after any significant event, such as hurricane, tornado, or series of earthquake shocks. It is also assumed that the periodic monitoring will occur on a monthly or quarterly basis.

The Sensor Unit is powered by 3 groups of AA alkaline batteries. It is assumed that each AA battery supplies roughly 1.5 V with a capacity of 2.5 Ampere hours [Rayovac, 1998]. The first group of 4 AA batteries powers the 6811 and its peripherals. This battery pack powers the digital portion of the data acquisition board also. The second group of 6 AA batteries supplies the Proxlink radio modem. The third group of 8 AA batteries supplies the sensors and the analog portion of the data acquisition board.

Figure 12:
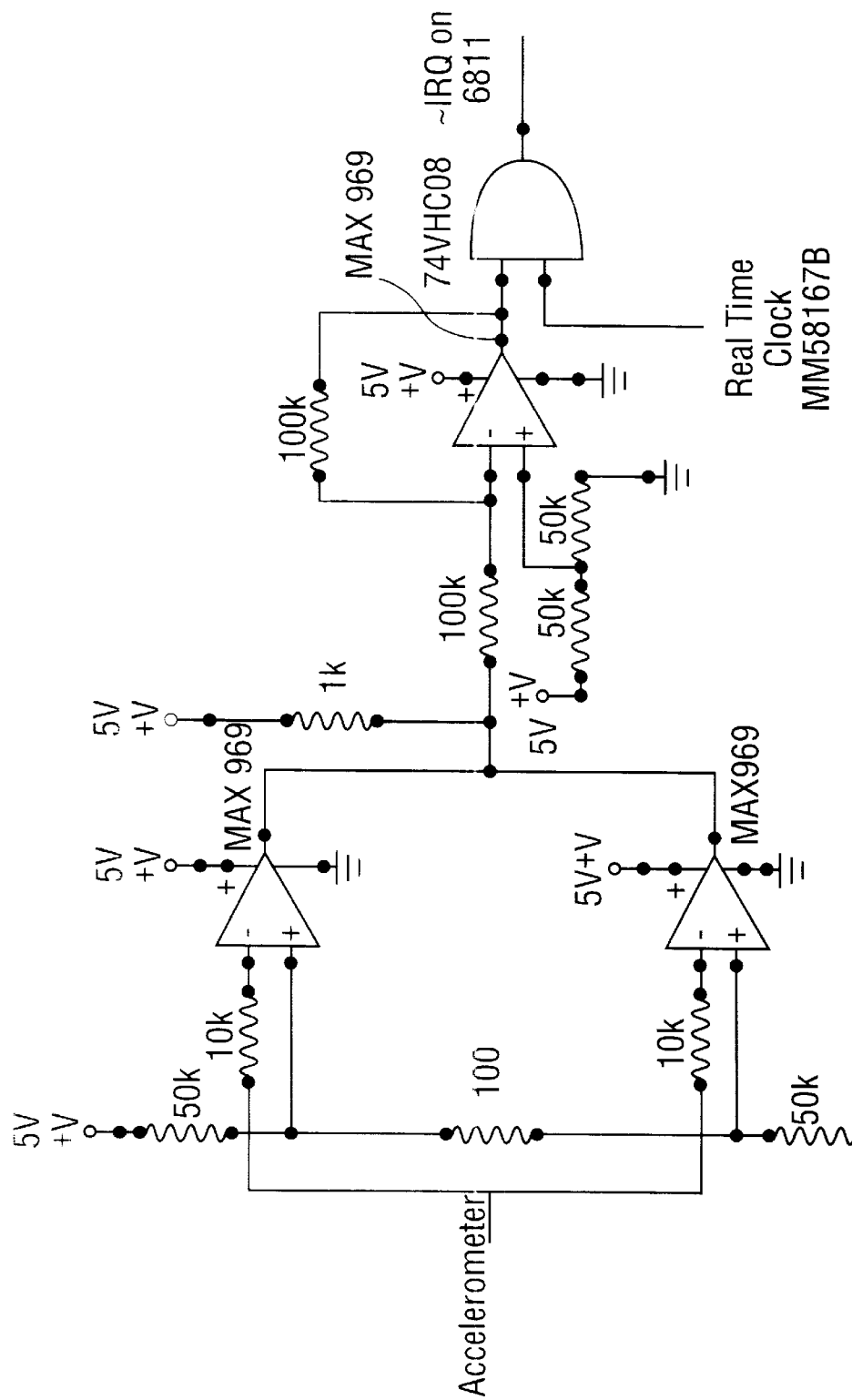
FIG. 12 is a schematic diagram of a triggering circuit used in a preferred embodiment of the present invention.

In the background state, a triggering circuit [Horowitz and Hill, 1989], shown in FIG. 12, awakes the 6811 microprocessor from the power saving STOP mode via an active low on the ~IRQ interrupt line. Functionally, the active components of the background state triggering circuit include one accelerometer left on to detect incoming earthquakes, a window comparator to detect threshold exceedance, inverting op-amp to give an active low on threshold exceedance, a two input AND gate to accommodate the alarm from the real time clock, and the microprocessor in the STOP mode awaiting an active low on the ~IRQ line.

The comparators as well as the AND gate in FIG. 12 are designed for low power and therefore have power consumption in the 10's of micro-amps. The resistive voltage dividers have paths to ground with current draw less than 50 micro amps. The dominant current drain in the background mode is the EG&IC 3145 accelerometer which has a current draw of 5 milli-amps. The power consumption of the accelerometer is nearly two orders of magnitude larger than all of the other components. Therefore, the expected life of the structure is dominated by the power consumption of the commercial accelerometer chosen. Assuming a 2.5 Ah capacity and a current draw of 5 milli-amps, the expected life of the Sensor Unit in the background mode is approximately 500 hours or 21 days. Note that this calculation was made with an accelerometer chosen without regard to its power consumption. A redesign of the Sensor Unit will undoubtedly use a lower power accelerometer for this purpose.

Given that the increase in the life expectancy is likely to come as improvements in the power consumption of the components and not as capacity increases in the batteries, a calculation is made of the average power draw needed to extend the life of the Sensor Unit to one year. The one year life expectancy is a design goal. A one year life expectancy on a 2.5 amp-hour capacity implies an average current draw of 290 micro-amps. This may be attainable using the circuit and components of FIG. 12 with an accelerometer having power consumption in the ten's of micro-amps.

In the active state where the Sensor Unit is acquiring and transmitting data to the Site Master, all of the components of the Sensor Unit are active and drawing several orders of magnitude more power than in the background state. The primary high current devices are the Proxlink and the 6811, each on their own battery packs. Independent of the background mode, a calculation of the life expectancy of the Sensor Units in the active mode is made. In the active state, the power consumption of the 6811 is approximately 50 milli-amps. The power consumption of the radio, when turned on to communicate with the Site Master, is on the order of 225 milli-amps. In the periodic monitoring or earthquake scenario, the 6811 will be on slightly longer than the Proxlink. However, given that the Proxlink will consume roughly four times the current, it will exhaust its battery pack first. Assuming a continuous active state of the Sensor Unit of acquiring and transmitting data to the Site Master, the 2.5 amp-hour battery pack will be exhausted in approximately 11 hours. Longer life expectancies can be obtained by a different choice of wireless modem and are not a flaw in the architecture of design of the Sensor Unit in general.

The Sensor Unit is the hardware and software manifestation of the vision of this invention. It enables the monitoring strategies and leverages emerging technologies to provide a solution to the monitoring needs of civil structures. In particular, the wireless and modular design philosophy has not been used in previous work in this field. The solutions presented here represent a new integrated approach to the data acquisition and instrumentation issues for monitoring civil structures.

The disclosed wireless protocol is a significant component in the viability of the types of systems disclosed here. The data acquisition board, from a power consumption and configuration standpoint, is currently not found in the prior art. Lastly, this description discloses the use in structural monitoring systems of new sensor technologies that have attractive features, such as on-sensor signal conditioning, form factors, and unit costs.

Structural Monitoring Strategies

As part of the overall monitoring strategy, this section begins with the pre-installation tasks and experiments necessary to fully exploit the capabilities of a structural monitoring system. In particular, it is assumed that structural monitoring is based on modal properties for the periodic scenario and on measurements of displacement or its derivatives in the earthquake scenario. This implies that periodic monitoring employs only global indicators while extreme event monitoring relies primarily on local or regional indicators. The modular monitoring system design of the present invention may be adapted to employ local and global measures for each monitoring scenario. Such a hybrid monitoring system would employ local and global measurements as indicators for both the periodic and extreme event scenarios.

Pre-Installation Tasks

Before one can begin installing a structural monitoring system there are a number of tasks and experiments that should be done. In particular, given a structure and the financial resources to instrument and monitor it, the number of instruments and their location need to be determined. There has been substantial research into the problem of optimum sensor location [Kammer, 1991] [Hemez, 1993] [Udwadia, 1994] [Heredia-Zavoni and Esteva, 1998]. Installation guidelines that allow adequate use of the present invention are known in the art.

Periodic Monitoring

The periodic monitoring scenario is responsible for identifying the incipient deterioration of the structure. In this setting, identifying the onset of deterioration is a difficult task due to the small nature of the changes and potential environmental noises that may obscure measurements. In its simplest form, periodic monitoring requires only knowledge of the vibrational properties of the structure; in its most complex form, the use of additional engineering judgment and analysis as to the expected failure modes of the structure is included and mathematical models of the structure are employed.

Assuming that the monitoring system is based on the use of modal analysis, it is critical to do an experimental modal test with a high number of instruments before the installation. The number of instruments should be large enough to allow a grid pattern across the structure and with a resolution sufficient to prevent spatial aliasing over the frequency range of interest. For example, a grid pattern of 30 accelerometers, in a six by five grid, for a single span of a two-lane highway bridge was sufficient to characterize the first 9 modes spanning a frequency range up to 30Hz.

Once all of the modes within the frequency range of interest have been identified, then decisions regarding the importance of each mode to the total response can be appraised. In particular, the modes and modal frequencies of interest are those that 1) will have sufficient excitation by the intended input sources, whether modal hammer or ambient excitation, and 2) are sensitive to the modal properties and also to the expected types of failure or deterioration in a specific structure if applicable. This can lead to a range of analytical techniques such as fatigue analysis, fracture mechanics, finite element modeling, and sensitivity analysis, among many. On the other hand, a monitoring strategy focused on simple changes in modal frequencies or selected mode shape components may require little, if any, analysis. These two competing schools of thought require the same monitoring system and therefore share the same instrumentation needs.

Based on the reduced set of modal properties and failure modes of interest, a limited set of instrumentation points can be selected to provide adequate observability. For the modeled structure, the experimental modal test results can also be used to calibrate a finite element model of the structure for better analysis and predictive response. For a modeled structure, the quantity of interest is the inferred changes in the model parameters in the mathematical model of the structure. For monitoring without a mathematical model, the quantity of interest is the modal properties themselves and significant changes in the modal properties are conditions for alert. In practice, the pre-installation process may involve iterative testing, modeling, and analysis.

Extreme Events: Earthquakes

In the earthquake scenario, the goal is to make a quick estimate of the amount of damage based on easy to obtain and simple measures of response. Specifically, the monitoring system must be able to perform all calculations within 5 to 10 minutes. For this scenario, it is assumed that the structure monitored is a building. It is assumed that the ground motion is significant in magnitude to cause the materials of the structure to behave in a non-elastic manner. In addition, due to the random nature of earthquake ground motion and the diversity in the degree and location of damage observed in structures from earthquakes, a strategy focused on instrumenting the structure at every floor or at a minimum every few floors is proposed. The feasibility of instrumenting every floor of a structure is largely a function of the unit cost of the Sensor Unit and in turn the cost of components. The implication is that the instrumentation should be spread throughout the structure to cover as many damage locations as possible.

Selective instrumenting can be employed to improve the degree of information at particular locations. Earthquake analysis procedures such as pushover analysis may be employed at this stage to identify potential locations of initial non-linearity and high seismic demand. This analysis can identify where instruments, in addition to the instruments located in the grid, should be placed.

Figure 13B:
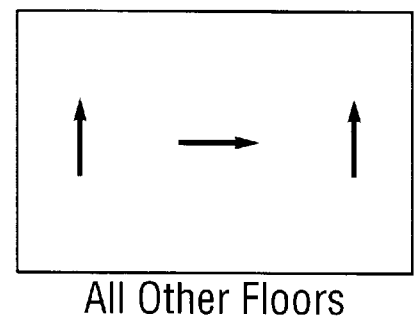
Figure 13C:
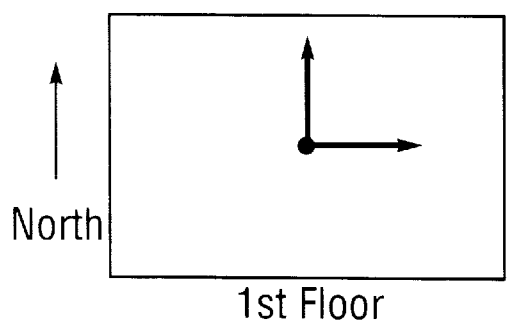

At each floor, a sufficient number of Sensor Units should be located to enable the resolution of two orthogonal horizontal translations as well as the measurement of torsional motion. In order to illustrate the instrumentation strategy, a hypothetical 8-story building is shown in FIG. 13A with the proposed instrumentation locations identified in FIGS. 13B and 13C.

This instrumentation positioning strategy is identical to the methodology used by the California Strong Motion Instrumentation Program (CSMIP) [CSMIP, 1996]. Each arrow indicates an accelerometer with its corresponding axis orientation.

On the first floor, a three component accelerometer inside one Sensor Unit can capture the mechanical vibrational motion imparted to the structure. This instrument is located at the approximate center of rigidity, about which the building is expected to exhibit purely translational motion. At all other floors, 3 Sensor Units with single accelerometers are employed to record the translational and torsional response.

In reality, most buildings do not exhibit the plan and elevation regularity of the hypothetical structure in FIG. 13A. Therefore, a case by case approach is required; however, the principles used in the hypothetical case apply to any structure. For this example, there would be at least 25 (1 Sensor Unit on the ground floor and 3 Sensor Units on each upper floor including the roof) Sensor Units plus a Site Master.

Extreme Event Monitoring Strategy

Figure 14:
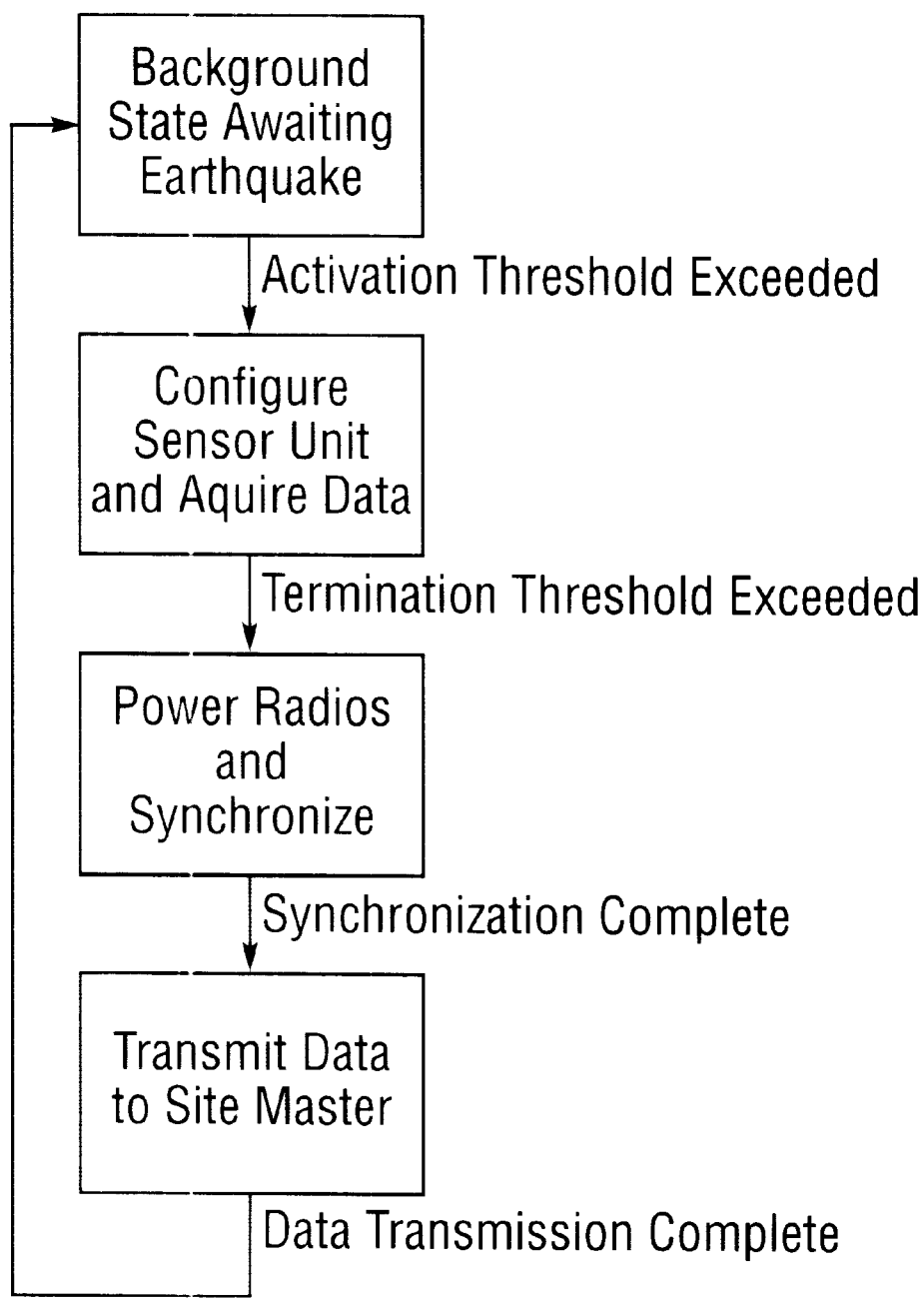
FIG. 14 is a flow chart of an extreme event monitoring procedure according to a preferred embodiment of the present invention.
Figure 15:
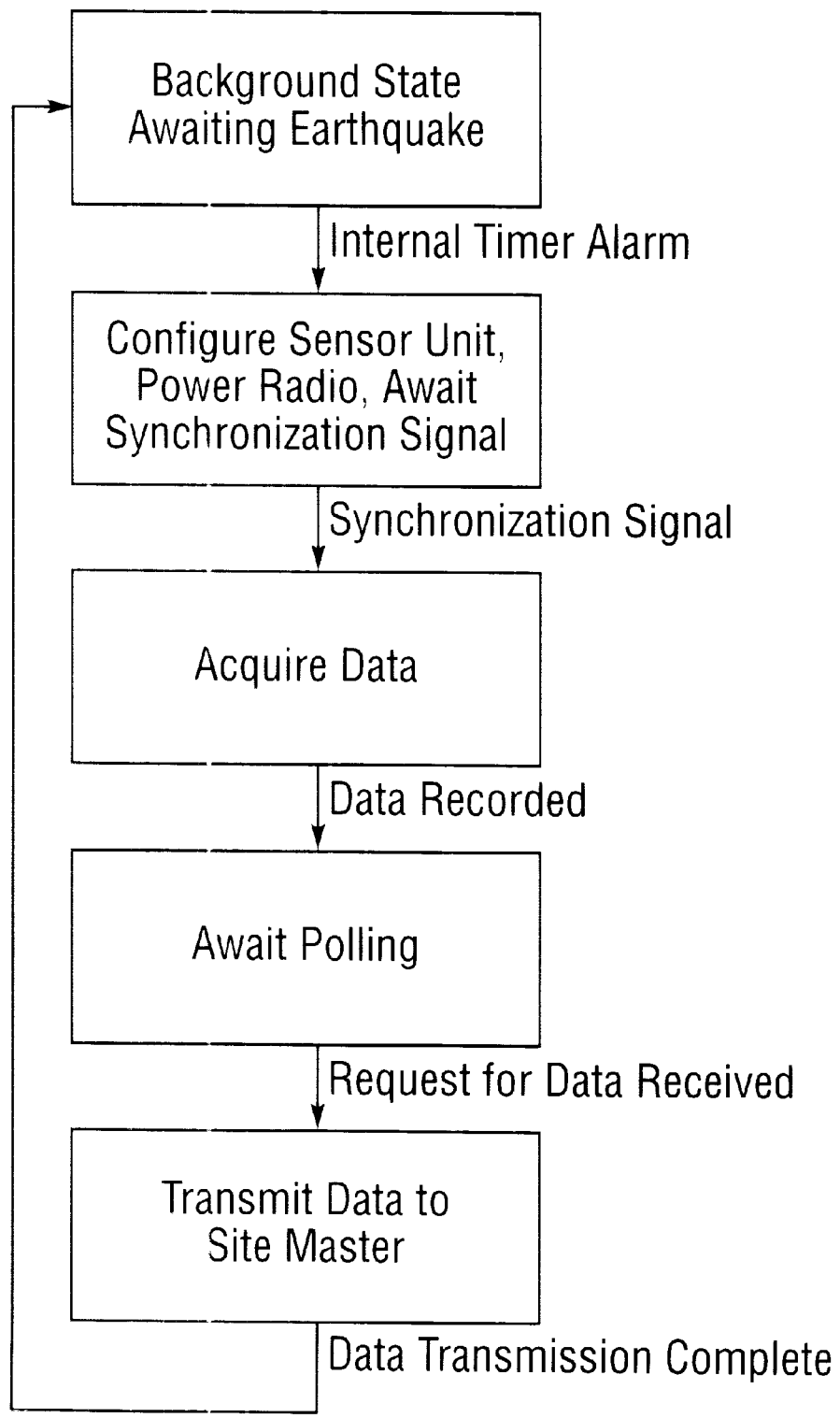
FIG. 15 is a flow chart of an periodic monitoring procedure according to a preferred embodiment of the present invention.

Once the locations, and therefore the number, of the Sensor Units have been determined the task is to specify the steps to perform the extreme event monitoring. In particular, the procedure to capture, communicate, and archive recorded Sensor Unit data is shown in a flowchart form in FIG. 14.

The starting point for extreme event monitoring is the background state. In the background state, the Sensor Unit is in a power conserving mode awaiting an earthquake. The only active components are the microprocessor running in a reduced power mode, a trigger accelerometer, and a triggering circuit to awake the microprocessor via an external interrupt line. Early in the design of the Sensor Units it was determined that the expense, in electrical power, to conduct radio modem communications for extreme event actuation far exceeded the electrical power supply available via conventional batteries. Therefore, it was concluded that radio modem communications should have the strictest operation budget and should be powered only when necessary. This requires the Sensor Units to self-actuate to an extreme event.

The microprocessor awakes when an activation threshold is exceeded. This activation threshold will be set on a case by case basis. A rule of thumb may be the exceedance of a 5 milli-g threshold. After being awakened, the microprocessor powers up all sensors and the data acquisition board, initializes all of the subsystems, and proceeds to acquire data until a termination threshold is reached. The termination threshold may be the non-exceedance of a range of acceleration over a specified time window. For the hypothetical 8 story building, the expected fundamental period of oscillation in seconds is approximated by [SEAOC Blue Book, 1996]

$$T = C_t (h_n)^{3/4}$$

where T is the fundamental period, $C_t$ is a calibration factor based on the type of structural system employed, and $h_n$ is the nominal height of the building. Assuming that the structure is a steel moment resisting frame, common in the San Francisco Bay Area, $C_t$ is 0.035. With a nominal story height of 12 feet, the structure is 96 feet tall. This implies a fundamental period of 1.1 seconds. The proposed rule of thumb is to set the termination threshold based on the non-exceedance of 5 milli-g's over a time window related to the fundamental period of the structure. The time window is chosen, somewhat arbitrarily, to be 5 times the fundamental period, or 5.5 seconds for the 8 story hypothetical building. This should allow enough time to ensure that the free response of the structure after the earthquake is properly captured.

Once the data has been acquired and stored locally at the Sensor Unit, the Sensor Unit powers up and initializes the radio modem. The first procedure is to synchronize the acquired time series data with the data acquired at all other Sensor Units. This system synchronization is necessary if time series analysis procedures are to be done at the Site Master or in later processing. In this procedure, the Site Master sends out a message on the radio modem for each Sensor Unit to power up and await a synchronization signal on the synchronization radio receiver. The Site Master is equipped with the only synchronization transmitter and it transmits to the Sensor Units a specified pattern of characters. The correct receipt of the synchronization pattern is indicative of a time stamp in which all Sensor Units calculate, via an internal counter, the length of time since they stopped acquiring data. This information is included in the data transmission of the recorded time samples to allow the data analysis software to synchronize all of the time recordings. Potential problems with this approach may arise due to the simplicity of the synchronization radios chosen and the ability of those radios to correctly accept a synchronization pulse after an earthquake.

With the data recorded and synchronized, data transmission via a round-robin polling procedure by the Site Master is initiated. The Site Master polls each Sensor Unit and requests its data, one Sensor Unit at a time. The data from each Sensor Unit is archived on the Site Master by the unique serial number of each radio modem. This allows the Site Master always to know where the data came from and the corresponding data channel information. Once the data from all available Sensor Units is transferred, the Site Master sends out a command for the Sensor Units to return to their background mode awaiting the next earthquake. With the data from all Sensor Units at the Site Master, the analysis of the data and subsequent decision process is then performed.

The data transmission time is a function of the type of sensors, sampling rate, resolution in bits, and the radio modem. In general, it is the goal in the earthquake scenario is to trigger, capture, transmit, and archive the entire earthquake recorded data within 30 minutes for a typical installation.

Long Term Periodic Monitoring Strategy

Assuming a rational placement of Sensor Units, the procedure to monitor a structure given an installed system is developed and shown in a flowchart in FIG. 5.

For periodic monitoring, the starting point is the same background state of the extreme event scenario. The main difference between the periodic and extreme event monitoring procedures is the data acquisition activation and termination events. In the periodic monitoring procedure, the Sensor Units awaken via an internal timer. The internal timer is a real time clock that is programmed to awake the Sensor Unit. The real time clock is programmed by the Sensor Unit the Sensor Unit enters the background state. Then, the Sensor Units power the radio modem and await instructions from the Site Master regarding the periodic monitoring test to be performed. The Sensor Units configure their subsystems according to the Site Master's instructions and await a synchronization signal from the synchronization radio to begin data acquisition. The Sensor Units then acquire the required data and await their turn to transmit the data to the Site Master.

Once all of the data is received at the Site Master, a radio message programs the Sensor Units when to awaken next. The Sensor Units then return to the background state awaiting an earthquake or other extreme event. At this point, the archived data on the Site Master is analyzed by the PC.

In the operation of a monitoring system with both an extreme event and periodic monitoring use, it is possible, however remote the possibility, that an earthquake may occur during the periodic monitoring procedure. In this case, the Sensor Units recognize the large signals of an extreme event versus the ambient excitation levels of a periodic monitoring. The Sensor Units, regardless of the current state, transition into the configuration and data acquisition state in the extreme event monitoring procedure. In effect, data just continues to be collected until the termination condition is satisfied.

Use of the Monitoring System

In the extreme event scenario, WiMMS must be ready at all times. In contrast, in the periodic monitoring scenario, the timing or periodicity of the measurements are defined by the operator of the system. It is possible that the monitoring system will be used only for the periodic monitoring of structures. This creates two possible installations: a permanent or temporary installation.

The permanent installation is the most likely use of the system. A permanent installation of WiMMS would allow for constant extreme event monitoring and periodic monitoring at specified time intervals. A permanent installation places the highest priority on the expected life of the Sensor Units when powered via batteries. The permanent installation also minimizes errors caused by inaccurate placement of the Sensor Units and the labor costs associated with repeat installations. Inaccurate placement is the error associated with the repeated placement of a sensor at a location in its position and orientation. This error is usually small for position but may be on the order of 1 or 2 angular degrees.

It is also feasible to employ the WiMMS, with no modifications to the Sensor Units, as a temporary system that is used on not one, but many structures. This system would likely be employed by bridge inventory managers, such as the California Department of Transportation (CalTrans), for the multitude of bridges that are not the single route between significant economic or strategic regions. For example, a permanent installation is completely warranted on a structure such as the Golden Gate Bridge, while a temporary installation may suffice for a single overpass along a city street or boulevard. A temporary installation may be made for a week at a time. During that week, several repetitive monitoring tests are made. The results of these tests may be conducted concurrently with visual inspection of the bridge every two years and to provide in situ safety factors for the structure.

The monitoring strategies and procedures described herein make several contributions to the state of the art. In particular, a methodology for the dual use of WiMMS for extreme events and periodic monitoring is presented, as well as a treatment of the design issues associated with the dual use of WiMMS. In addition, a procedure for pre-installation testing and decisions regarding the number and location of Sensor Units is described. A solution to the synchronization problem of the Sensor Units based on the choice of radio modem is discussed.

Analysis Software

Analysis software applicable to monitoring civil structures is commercially available, or may be custom designed. Preferably, the analysis software program should have modules to perform modal analysis and damage identification. The modal analysis provides the input to the damage identification module. Commercially available software packages usually offer only a single modal analysis technique. In contrast, most researchers in modal analysis are familiar with at least a couple of techniques and regularly employ multiple techniques depending on the testing situation. There are basically four main types of modal extraction analysis techniques: operating shapes, rational polynomial, eigensystem realization algorithm, and complex exponential. Preferrably, all of the methods should be available so that one can use any particular method when it is advantageous to do so.

Extreme Event Analysis Software

In the extreme event scenario, the monitoring system is asked to supply several quick indicators of a structure's health within ten's of minutes. This information can then be used by emergency response and inventory managers of the structure to determine its condition. Two earthquake response measures are conventionally employed to represent the gross nature of the structure after a hazardous earthquake event: Arias Intensity and Inter-Story Drift. Since WiMMS has not recorded strong motion from a structure, digital recordings from existing strong motion instrumentation programs are used in this section.

For the extreme event scenario, and specifically earthquakes, the use of Arias Intensity as a quick indicator is significant in this application. The calculation is leveraged by the modular design of the system and can be implemented at the Sensor Unit level, allowing computational efficiencies not afforded in centralized data acquisition systems. The inter-story drift calculations serve two purposes. First, inter-story drift has been related to damage levels in reports such as FEMA 273 for various structural classes, providing a quick route to general condition assessment. Second, it is directly observable. Therefore, it does not have to be inferred from a finite element analysis. While the inter-story drift has long been used as a post analysis tool, it has not been employed for use as a near real time indicator. In addition, its use represents a departure from increasing model sophistication in light of insufficient model or structure fidelity. In reality, the detailed modeling of civil structures is largely an exercise in rational estimation and not sufficiently modeled or understood to a level to warrant more sophisticated analysis in the near real time scenario.

CONCLUSIONS AND ALTERNATE EMBODIMENTS

This invention provides a wireless, modular monitoring system (WiMMS) for civil structures. The primary contribution in this invention is the concept of the Sensor Unit for use in the monitoring of civil structures. The Sensor Unit is the hardware and software manifestation of the vision of this invention. It enables the monitoring strategies and leverages emerging technologies to provide a solution to the monitoring needs of civil structures. In particular, a flexible, multipoint wireless and modular design philosophy has not been used in previous work in this field. The solutions presented here represent a new integrated approach to the data acquisition and instrumentation issues of monitoring civil structures.

It will be appreciated that the approach to structural monitoring disclosed herein is applicable to various types of structural measurements and instrumentation for making them. Because every civil structure is different in design, construction, and environmental setting, the particular instrumentation and structural parameters appropriate for the task will naturally vary. The approach of the present invention, however, can be adapted by those skilled in the art to these various needs. For example, the sensors used in the context of the present invention may include sensors of acceleration, strain, humidity, galvanic corrosion, salt, and other parameters related to the condition or properties of a civil structure.

For the monitoring of civil structures, the predominant types of sensors have been the metal foil strain gage and the accelerometer. In practice, the application of these two instruments has been largely mutually exclusive; monitoring systems have employed one or the other. Recently, the Federal Highway Administration has funded a project to make a wireless data acquisition system specifically for local analysis [Maser, 1996]. Strain gages provide a local measurement while accelerometers are used primarily as part of a global structural vibration monitoring strategy. In some embodiments of the invention, it is advantageous to use a hybrid system that employs both local and global measurement and analysis techniques. The first attempt toward this goal is evident in the local extreme event strategy and the global periodic monitoring strategy proposed in this invention. These two types of measurement need to reinforce each other. Combining the information from both types of measurement can help address the problem of observability of the damage implied from modal analysis with local validation.

The present invention provides a scalable and versatile model of structural monitoring that may be adapted to appropriate changes in the number and location of instruments used to monitor a structure. Numerical techniques may be used to select the optimum sensor locations for modal analysis. The application of these techniques should be balanced with the researcher's knowledge of the structure. In fact, a more fundamental analysis is also needed. Specifically, it is difficult to monitor damage without knowledge of what type of damage is most probable and where it is most likely to occur. Therefore, an analysis of the expected failure modes and the probable failure locations is warranted prior to the installation of a monitoring system. In the periodic monitoring scenario, these locations may be associated with areas of minimal redundancy or cyclic fatigue. In the extreme event scenario, these locations may be identified as locations of high strength demand.

Various designs changes to the Sensor Unit are appropriate for commercial implementations of the invention. A table of the preferred components used in such an embodiment of the Sensor Unit is shown in Table 7.

TABLE 7

| Component | Sensor Unit #1 | Sensor Unit #2 |
|---|---|---|
| Microprocessor | 6811 | Low power x86 |
| Wireless Communication | Proxim Proxlink | Wireless LAN |
| Data Acquisition | PCB Board, H171881P chip, 8 channels, 16 bit resolution | Include unity gain buffers, anti-aliasing filters and adjustable sampling rate |
| Sensors | Accelerometers | Strain, Corrosion, etc |
| Data Storage | Data Logging Board | Non-volatile Flash Disk |

TABLE 7-continued

| Component | Sensor Unit #1 | Sensor Unit #2 |
| --- | --- | --- |
| Packaging | Exposed, Plexiglass | Enclosed, injected plastic |
| Networking Software | Sensor Unit to Site Master | Any point to Any point |
| Power Source | Alkaline Battery | Lithium Battery, Fuel Cell, Solar Cell |

These and other variations in the components will be obvious to those of ordinary skill in the art. Accordingly, the appended claims should not be construed to be limited by the particular choices of components described above for the purposes of enablement.

APPENDIX REFERENCES

*Abacomt Technologies User Docunments*, (1996) Abacom Technologies, Etobicoke, Ontario, Canada, 1996.

Aktan, A. E., Hunt, V. J., Lally, M. J., Stillmaker, R. B., Brown, D. L., and Shelley, S. J., (1995), "Field Laboratory for Modal Analysis and Condition Assessment of Highway Bridges", *Proceedings of International Modal Analysis Conference XV*, Honolulu, Hi., Pages 718–727.

Bennett, S. W., (1997), "Queensboro Bridge Complete Rehabilitation Program", *Proceedings of the 1997 Structures Congress,* Portland, Oreg., Pages 914–918.

California Strong Motion Instrumentation Program (CSMIP), (1994), *Processed Data for Shernman Oaks 13-story Commercial Building from the Northridge Earthquake of Jan.* 17, 1994, Report OSMS 94-11B.

Catbas, F. N., Lenett, M., Aktan, A. E., Brown, D. L., Helmicki, A. J., Hunt, V., (1998), "Damage Detection and Condition Assessment of Seymour Bridge", *Proceedings of the XVI International Modal Analysis Conference*, Santa Barbara, Calif., Feb. 1998, Pages 1694–1702.

Converse, A. M., and Brady, A. G., (1992), "BAP: Basic Strong-Motion Accelerogram Processing Software Version 1.0", *USGS Open File* 92–296A, March 1992.

Doebling, S. W., Farrar, C. R., Prime, M. B., and Shevitz, D. W., (1996), "Damage Identification and Health Monitoring of Structural and Mechanical Systems from Changes in Their Vibration Characteristics: A Literature Review", Los Alamos National Laboratory, Report LA- 13070-MS.

Farrar, C. R., (1996), Technical Staff Member, Engineering and Science Applications Division, Los Alamos National Laboratory, Personal Conversations.

Farrar, C. R., et al, (1994), "Dynamic Characterization and Damage Detection in the I -40 Bridge Over the Rio Grande", Los Alamos National Laboratory, Report LA-12767-MS.

Harik, I. E., Shaaban, A. M., Gesund, H., Valli, G. Y. S., and Wang, S. T., (1990), "United States Bridge Failures, 1951–1998", *Journal of Performance of Constructed Facilities*, Volume 4, No. 4, Nov. 1990, Pages 272–277.

Haroun, M. A., Pardoen, G. C., Bhatia, H., and Shahi, S., (1998), "Comparative Testing of Full and Half Scale Models of Bridge Pier Walls", *Proceedings of XVI International Modal Analysis Conference*, Santa Barbara, Calif., Pages 1777–1783.

H17188 *Specification Data Sheet*, Harris Corporation, July 1996.

HC11, M68HC11 Reference Manual, Motorola, Inc., January 1995.

Hemez, F. M., (1993) "Theoretical and Experimental Correlation Between Finite Element Models and Modal Tests in the Context of Large Flexible Space Structures", Ph.D. Thesis, Aerospace Engineering Sciences, University of Colorado, 1993.

Henke, R., and Ohnstad, D., (1991), "EMC-Controlled Board Design", *Printed Circuit Design*, Issue July 1991, Pages 28–38.

Heredia-Zavoni, E., and Esteva, L., (1998), "Optimal Instrumentation of Uncertain Structural Systems Subject to Earthquake Ground Motions", *Journal of Earthquake Engineering and Structural Dynamics*, Volume 27, Issue 4, Pages 343–362.

Horowitz, P., and Hill, W., (1989), *The Art of Electronics*, Cambridge University Press, New York, N.Y., Page 669.

Ideal, Version 2.15B, (1996), Creative Applications Engineering, Stanford, Calif.

Introl C Compiler V.3.09, (1994), Introl Corporation, Milwaukee, Wis.

Kammer, D. C., (1991), "Sensor Placement for On-orbit Modal Identification and Correlation of Large Space Structures", *Journal of Guidance*, Volume 14, No. 2, March 1991, Pages 251–259.

Kramer, S. L., (1996), *Geotechnical Earthquake Engineering*, Prentice Hall, N.J., Page 82.

Lee, H., (1997), United States Geological Survey (USGS), Personal Conversations.

Levi, A., Hunt, V., Helmicki, A, Aktan, A., (1998), "Instrumented Monitoring and Diagnostic Load Testing of Steel Stringer Bridges", *Proceedings of the XVI International Modal Analysis Conference*, Santa Barbara, Calif., February 1998, Pages 392–399.

Lenett, M., Catbas, N., Hunt, A., Aktan, A. E., Helmicki, A., and Brown, D. L., (1997), "Issues in Multi-Reference Impact Testing of Steel-Stringer Bridges", *Proceedings of International Modal Analysis Conference XVII*, Orlando, Fla., Pages 374–380.

Maser, K., Egri, R., Lichtenstein, A., Chase, S., (1996), "Development of a Wireless Global Bridge Evaluation and Monitoring System", *Proceedings of the* 14th, Structures Congress, Chicago, Ill., 1996, Pages 734–741.

Mondello, F. J., (1989), "Inspection and Evaluating New York's East River Suspension Bridge Cables", Journal of Public Works, Volume 120, No. 1, January 1989, Pages 44–48.

Nigbor, R., (1997), President Kinemetrics Inc., Personal Conversations.

Pappa, R. S. and Elliot, K. B. (1993), "Consistent-Mode Indicator for the Eigensystem Realization Algorithm", *Journal of Guidance*, Volume 16, No. 5, Pages 852–858.

Pappa, R. S., and Juang, J. (1985), "An Eigensystem Realization Algorithm for Modal Parameter Identification and Model Reduction", *Journal of Guidance*, Volume 8, No. 5, Pages 620–627.

Priestley, M. J. N, Xiao, Y., and Seible, F., (1996), "Seismic assessment and retrofit of bridge column footings", ACI Structural Journal, Volume 93, No. 1, January 1996, Pages 79–94.

*Proxim Proxlink OEM RF Integration Manual*, Proxim Inc., June 1994.

Rayovac OEM Guide, http://www.rayovac.com/, 1998.

Sohn, H. and Law, K. H., (1997), "A Bayesian Probabilistic Approach for Structure Damage Detection", *Journal of*

Earthquake Engineering and Structural Dynamics, Volume 26, Pages 1259–1281.

Sohn, H. et al., (1998), "An Experimental Study of Temperature Effects on Modal Parameters of the Alamosa Canyon Bridge", submitted to *Journal of Earthquake Engineering and Structural Dynamics*, March, 1998

Straser, E. G., and Kiremidjian, A. S., (1997), "A Modular, Visual Approach to Damage Monitoring for Civil Structures", Proceedings of $2_{nd}$ *World Conference on Structural Control*, Hong Kong, 1997.

Structural Engineers Association of California, SEAOC, (1996), "Recommended Lateral Force Requirements and Commentary", Sixth Edition, Page 11.

Udwadia, F. E., (1994), "Methodology for Optimum Sensor Locations for Parameter Identification in Dynamic Systems", *Journal of Engineering Mechanics*, Volume 120, No. 2, February 1994, Pages 368–390.

Ventura, C. E., Liam Finn, W. D., and Schuster, N. D. (1995), "Seismic Response of Instrumented Structures During the 1994 Northridge, California, Earthquake", *Canadian Journal of Civil Engineering*, Volume 22, Pages 316–337.

What is claimed is:

1. A system for monitoring structural properties of a large civil structure during structural overloading caused by a natural hazard or other extreme event, the system comprising:
   a) a plurality of self-powered sensor units, wherein each sensor unit comprises:
      I) a mechanical vibration sensor mechanically coupled to the civil structure and producing an analog electrical signal representative of mechanical vibrations in a localized area of the civil structure;
      ii) a data acquisition circuit electrically coupled to the mechanical vibration sensor and producing from the analog electrical signal a digital signal data stream representative of the mechanical vibrations;
      iii) a digital wireless transmitter coupled to the data acquisition circuit and producing from the digital data stream a wireless signal containing digital information in the digital data stream;
      iv) an electrical battery supplying power to the data acquisition circuit and to the digital wireless transmitter; and
   b) a site master unit comprising:
      I) a digital wireless receiver coupled to the wireless signal of each sensor unit and reproducing the digital information of each sensor unit;
      ii) a microprocessor couple to the receiver and programmed to collect and to analyze the digital information from the plurality of sensor units to determine the condition of the structure as a result of a natural hazard or other extreme event.

2. The system of claim 1 wherein the mechanical vibration sensor is an accelerometer.

3. The system of claim 1 wherein the wireless signal is a spread spectrum signal.

4. The system of claim 1 wherein each sensor unit further comprises a triggering circuit coupled to the vibration sensor and to the data acquisition circuit, wherein the triggering circuit activates data acquisition when the analog electrical signal exceeds a predetermined threshold.

5. The system of claim 1 wherein each sensor further comprises a digital memory for temporarily storing the digital data stream prior to transmission.

6. A method for monitoring structural properties of a large civil structure, the method comprising:
   a) sensing mechanical vibrations at a plurality of locations in the structure;
   b) converting at the plurality of locations the sensed vibrations into digital signals representative of the mechanical vibrations;
   c) transmitting wireless signals from the plurality of locations to a central location, wherein the wireless signals contain contain digital information in the digital signals;
   d) receiving the wireless signals at the central location; and
   e) storing and processing the wireless signals at the central location to provide information useful in determining the structural condition of the civil structure.

7. The method of claim 1 wherein the sensing is performed using an accelerometer.

8. The method of claim 1 wherein the wireless signals are spread spectrum signals.

9. The method of claim 1 further comprising triggering the sensing, converting, and transmitting when a sensed vibration exceeds a predetermined threshold.

10. The method of claim 1 further comprising temporarily storing the digital signals at the plurality of locations prior to transmission.

* * * * *